United States Patent
Itasaki et al.

(10) Patent No.: US 7,821,397 B2
(45) Date of Patent: Oct. 26, 2010

(54) INFORMATION ACCESS SYSTEM, READER/WRITER DEVICE, AND ACTIVE-TYPE CONTACTLESS INFORMATION STORAGE DEVICE

(75) Inventors: Akira Itasaki, Kawasaki (JP); Shinichi Shiotsu, Kawasaki (JP); Satoshi Inano, Kawasaki (JP); Isamu Yamada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 300 days.

(21) Appl. No.: 11/983,689

(22) Filed: Nov. 9, 2007

(65) Prior Publication Data

US 2008/0122584 A1      May 29, 2008

(30) Foreign Application Priority Data

Nov. 24, 2006    (JP)    ............................. 2006-316773

(51) Int. Cl.
*G08B 13/14*    (2006.01)
(52) U.S. Cl. .............. 340/572.1; 340/572.2; 340/572.3; 340/572.4; 340/572.6; 340/572.5; 235/385
(58) Field of Classification Search .............. 340/272.1, 340/10.1, 572.1–572.9; 235/385
See application file for complete search history.

(56) References Cited

U.S. PATENT DOCUMENTS

| 2001/0050580 | A1* | 12/2001 | O'Toole et al. ............. 327/158 |
| 2007/0063817 | A1* | 3/2007 | Cherry ...................... 340/10.1 |
| 2008/0001746 | A1* | 1/2008 | Childress et al. ......... 340/572.1 |
| 2008/0279287 | A1* | 11/2008 | Asahina ...................... 375/242 |

FOREIGN PATENT DOCUMENTS

| JP | 2000-113130 | 4/2000 |
| JP | 2001-251210 | 9/2001 |
| JP | 2005-316724 | 11/2005 |
| WO | WO 97/43740 | 11/1997 |

* cited by examiner

*Primary Examiner*—Davetta W Goins
*Assistant Examiner*—Ojiako Nwugo
(74) *Attorney, Agent, or Firm*—Greer, Burns & Crain, Ltd.

(57) ABSTRACT

In an information access system, an active-type contactless information storage device senses a carrier of an RF signal at a first frequency in time periods for carrier sensing occurring in a predetermined carrier sensing cycle period, and then in response to detection of a carrier of an RF signal at the first frequency, further receives the information request signal, while it also transmits the tag information signal at a second frequency carrying information in time periods for tag information transmission occurring in a predetermined tag information transmitting cycle period. A reader/writer device cyclically transmits an information request signal carrying values of the predetermined carrier sensing cycle period and the predetermined tag information transmitting cycle period, at a first frequency during a predetermined period of time for information request transmission, and in response to reception of a tag information signal at the second frequency, reproduces and compares received tag information with a list of tag information. In response to reception of the information request signal, the active-type contactless information storage device reproduces and sets the values of the two predetermined cycle periods into its respective timers. Thus the active-type contactless information storage device reduces its power consumption.

20 Claims, 18 Drawing Sheets

INFORMATION ACCESS SYSTEM, READER/WRITER DEVICE, AND ACTIVE-TYPE CONTACTLESS INFORMATION STORAGE DEVICE

FIELD OF THE INVENTION

The present invention relates generally to reading and writing information from and into an active-type contactless information storage device, and in particular to a reader/writer device which reads and writes information from and into an active-type RF ID tag of low power consumption.

BACKGROUND OF THE INVENTION

An RF ID tag with a battery power supply or of an active type, which is attached to a merchandise article or the like, or carried by a person, transmits an RF signal at a predetermined frequency that carries an ID and other information related to the article or the person, so that the RF signal is received and the information is read out by a reader device. The read-out information is further processed by a computer or the like, so that the distribution of the article or the action of the person is monitored and managed. The active-type RF ID tag with battery power supply has a larger communication range than a passive-type RF ID tag that receives power from a reader/writer device in a contactless manner, and hence is practical in use. However, the active-type RF ID tag transmits an RF signal in a fixed cycle, has a risk of being tracked by a third party, and hence has a problem in the security. To address this security problem, there has been developed an improved active-type RF ID tag that responds only to a tag ID request transmitted by the reader/writer device.

PCT International Publication WO 97/43740 published on Nov. 20, 1997 describes radio frequencies identification device which includes an integrated circuit including a receiver, a transmitter and a microprocessor. The receiver and transmitter together form an active transponder. The integrated circuit is preferably a monolithic single die integrated circuit including the receiver, the transmitter and the microprocessor. Because the device includes an active transponder, instead of a transponder which relies on magnetic coupling for power, the device has a much larger range.

Japanese Patent Application Publication JP 2000-113130-A published on Apr. 21, 2000 describes an IC tag detection system with low power consumption. This system includes a plurality of IC tags provided with different set times of day. Each IC tag includes a communication circuit, a control unit, a power source unit for supplying power from a battery to them, and time measuring means. Each IC tag performs transmission at each prescribed set time of day. This system also includes a detector for detecting the presence or absence of the IC tags based on the communication with them. The detector has a communication circuit, and determines the presence or absence of reception from them successively at the respective set times of day of the respective IC tags. Since the IC tag receives no inquiry from the detector, the IC tag can avoid useless reaction and battery consumption.

Japanese Patent Application Publication JP 2001-251210-A published on Sep. 14, 2001 (which corresponds to U.S. Pat. No. 6,922,402-B1) describes a method of locking a frequency in a transmitter at each of two nodes in a full duplex link, without using a separate reference oscillator in each node. The method provides locking of transmission frequencies of both nodes in a full duplex link at the same time by utilizing information of a received frequency to tune carrier frequencies of the transmitters. The offset of the carrier frequency of the fist transmitter is detected as the offset of a second corresponding receiver. The second receiver shifts the carrier frequency of the second transmitter, in response to the detected offset, to inform the first transmitter about the detected offset. The first receiver uses the detected offset to correct the carrier frequency of the first transmitter.

Japanese Patent Application Publication JP 2005-316724-A published on Oct. 10, 2005 describes an active-type RF ID tag. The active RF ID tag includes a nonvolatile memory for storing individual identifiers, an operation part for obtaining an identifier and producing a transmission signal including the identifier, a modulation circuit for modulating the produced transmission signal, an antenna for transmitting the modulated signal, and a photo-detection part for detecting real illuminance corresponding to surrounding brightness. The active RF ID tag operates by using the power of a battery provided therein. In the active RF ID tag, the operation part recognizes the real illuminance detected by a photoconductive element in the photo-detection part through an A/D conversion circuit, and produces a transmission signal when it determines that the real illuminance exceeds an illuminance threshold stored in the nonvolatile memory. This automatically controls an RF signal to be transmitted or not to be transmitted, to thereby reduce power consumption and extend a life of the battery.

SUMMARY OF THE INVENTION

In an aspect of the present invention, an information access system is provided for accessing information stored in a contactless information storage device, and comprises a reader/writer device connected to an information processing apparatus and an active-type contactless information storage device. The reader/writer device includes: a first timer; a first memory; a first transmitter unit which is capable of cyclically transmitting an information request signal at a first frequency during a predetermined period of time for information request transmission; a first receiver unit which is continuously ready to receive an RF signal at a second frequency different from the first frequency; and a first controller which, in response to reception of a tag information signal at the second frequency, reproduces and compares received tag information carried by the tag information signal with a list of tag information in the first memory. The active-type contactless information storage device includes: a second memory; a battery; a second timer which measures a first predetermined cycle period for transmitting tag information; a third timer which measures a second predetermined cycle period for sensing a carrier; a second receiver unit which is capable of sensing a carrier of an RF signal at the first frequency for detection; a second transmitter unit which is capable of transmitting a tag information signal at the second frequency; and a second controller which controls the second receiver unit to sense a carrier of an RF signal at the first frequency in time periods for carrier sensing occurring in the second predetermined cycle period, then in response to detection of a carrier of an RF signal at the first frequency in the receiver unit, causes the receiver unit to further receive the information request signal, and also causes the second transmitter unit to transmit the tag information signal at the second frequency carrying information stored in the second memory in time periods for tag information transmission occurring in the first predetermined cycle period. In response to reception of the information request signal in the second receiver unit, the second controller reproduces and processes received information carried by the information request signal. In response to non-detection of an RF signal at the first frequency in a particular time period for carrier sensing in the second receiver unit, the second controller controls the second receiver unit to maintain an inactive state during a non-carrier sensing period before a subsequent time period for carrier sensing. The second controller controls the second transmitter unit to maintain an inactive state during a non-transmission period between a particular time period for tag information transmission and a subsequent time period for tag information transmission.

The invention also relates to a reader/writer device and an active-type contactless information storage device which can be used in the information access system described above.

BRIEF DESCRIPTION OF THE DRAWINGS

FIG. 11A shows a time chart of processing for transmission of an RF signal carrying data containing a tag ID request or an information request command (CMD) transmitted by reader/writer devices arranged at different positions.

DESCRIPTION OF THE PREFERRED EMBODIMENTS

The known improved active-type RF ID tag that responds only to a tag ID request transmitted by a reader/writer device requires a receiving circuit, and hence has a larger circuit size and a significantly higher power consumption than the active-type RF ID tag capable solely of transmission.

The inventors have recognized that a reader/writer device, which is adapted to continually transmit, upon detection an RF ID tag, a signal to the RF ID tag at a particular frequency only during a predetermined period of time and be continuously ready to receive an RF signal from the RF ID tag at a different frequency, will significantly reduce the power consumption of the RF ID tag, so that its battery run time can be extended.

An object of the present invention is to reduce the power consumption of a contactless information storage device.

Another object of the invention is to allow a reader/writer device to control the intervals of carrier sensing and RF signal transmission in a contactless information storage device.

According to the invention, the power consumption of a contactless information storage device can be reduced, and a reader/writer device is allowed to control the intervals of carrier sensing and RF signal transmission in a contactless information storage device.

Figure 1:
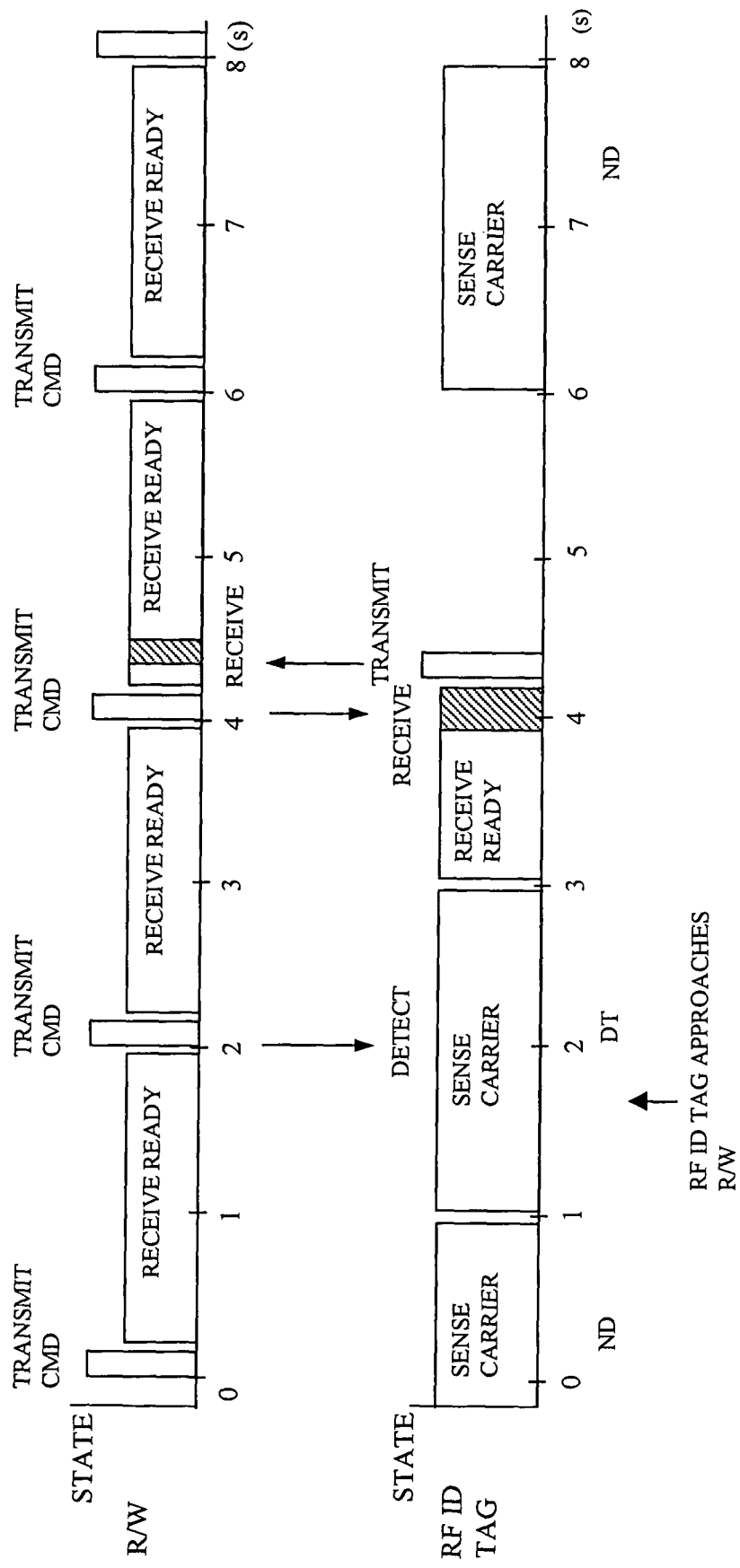
FIG. 1 is a time chart of a conventional improved active-type RF ID tag and of a reader/writer device (R/W) for reading the RF ID tag.

FIG. 1 is a time chart of a conventional improved active-type RF ID tag and of a reader/writer device (R/W) for reading the RF ID tag. The reader/writer device transmits a command (CMD) and receives a response from the RF ID on the same frequency channel in a time division manner. The reader/writer device transmits a command of requesting an ID in a fixed cycle for example, of two (2) seconds and in the duration, for example, of 100 ms. In the remaining time, the reader/writer device is in a state of receive ready.

In order for such a single reader/writer device to accommodate a plurality of RF ID tags, each RF ID tag is typically adapted to transmit a response signal to the reader/writer device at a random timing in response to the receipt of a single ID request transmitted by the reader/writer device, so as to avoid possible collision with another response signal. Each RF ID tag transmits a response signal to the reader/writer device in a time slot selected at random within a predetermined period of time subsequent to the receipt of the command, so that the probability of collision between the response signals is reduced. However, the reader/writer device is required to extend the duration of the state of receive ready. For example, if the duration for response transmission at a random timing from the RF ID tag is between zero (0) and 1.5 seconds or the like, the reader/writer device requires a duration of the receive ready state for 1.5 seconds or longer. This increases the cycle length of command transmission in the reader/writer device. On the other hand, in order to detect a request command transmitted by the reader/writer device, the RF ID tag senses, in a fixed cycle, a carrier, i.e., detects the intensity of a received RF signal. The RF ID tag is adapted to operate for reception and then operate for transmission, only when a carrier is detected. If the cycle length of transmission in the reader/writer device is two (2) seconds as an example, the carrier sensing duration also requires to have about two or more seconds in order to ensure the detection.

In general, when the RF ID tag receives no request from the reader/writer device, the RF ID tag is required to enter into a power down mode of operation in a duration intervening between adjacent carrier sensing durations so that the power consumption is reduced as much as possible and that the battery run time is extended. However, if about two seconds is reserved for the carrier sensing duration, little time remains for the power down duration, and hence it is difficult to significantly reduce the power consumption.

Thus, the active-type RF ID tag of FIG. 1 which is required to respond to a request command transmitted in a long cycle requires a long carrier sensing duration. This increases the power consumption, and hence reduces the battery run time.

The invention will be described in connection with non-limiting embodiments with reference to the accompanying drawings. Throughout the drawings, similar symbols and numerals indicate similar items and functions.

Figure 2:
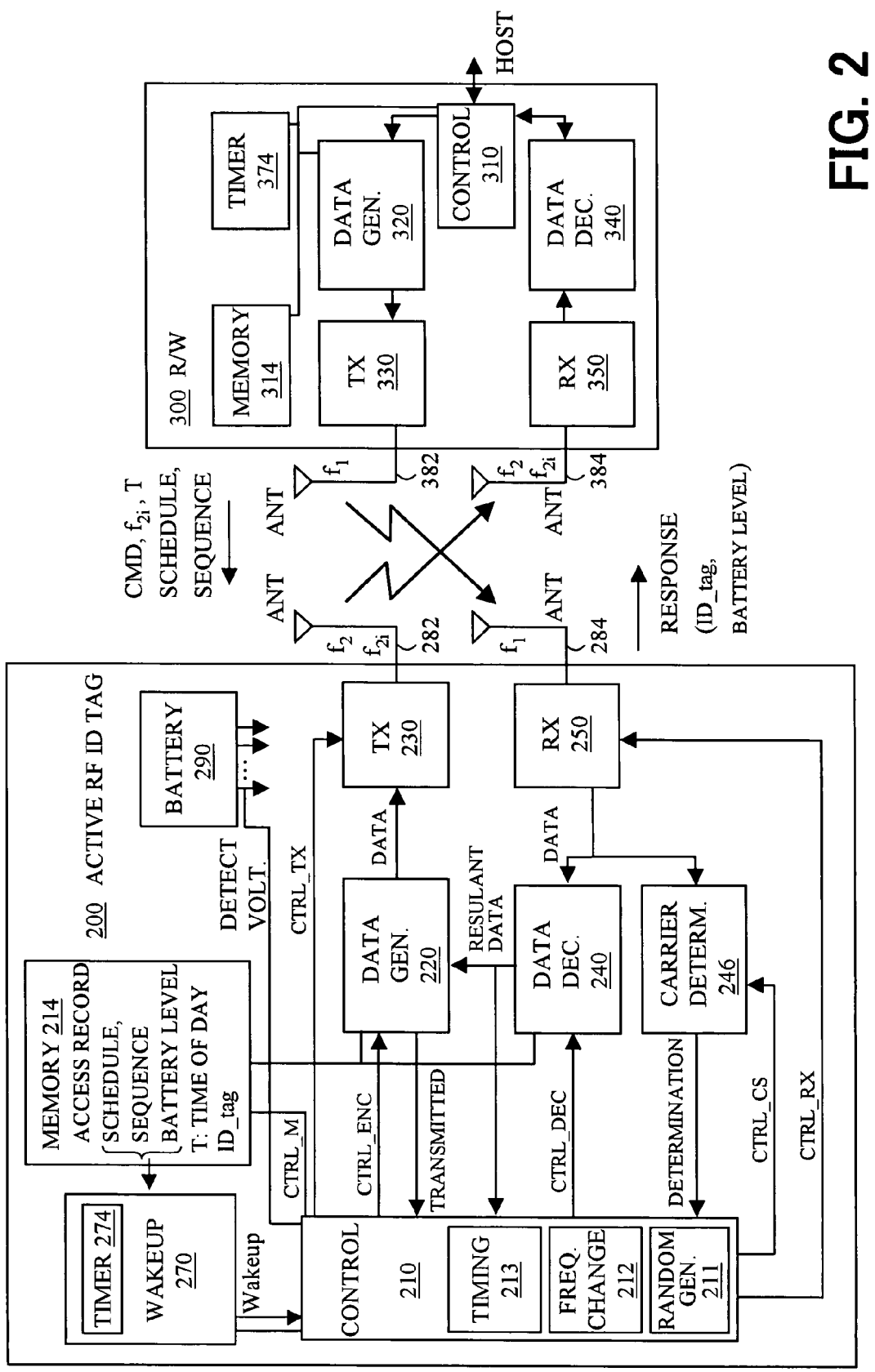
FIG. 2 shows the configurations of a further improved active-type RF ID tag as an active-type contactless information storage device and of a reader/writer device.

FIG. 2 shows the configurations of a further improved active-type RF ID tag 200 as an active-type contactless information storage device and of a reader/writer device 300. As an active-type contactless information storage device, a contactless IC card having a configuration similar to that of the active-type RF ID tag 200 may be used in place of the active-type RF ID tag 200.

The active-type RF ID tag 200 includes: a control unit 210; a memory 214; a data generation unit 220 for encoding data such as a tag ID (ID_tag) stored in the memory 214 in accordance with a predetermined encoding scheme to thereby generate encoded data; a transmitter unit (TX) 230 for modulating a carrier with the encoded data of a baseband received from the data generation unit 220, and then transmitting an RF signal at a frequency $f_2$ or RF signals at different frequencies $f_{2i}$ (i=1, 2, ..., n); a receiver unit (RX) 250 for receiving and demodulating an RF signal at a frequency $f_1$, to thereby reproduce baseband encoded data, and then generating data indicative of the carrier intensity of the received RF signal; a data decoding unit 240 for decoding the encoded data received from the receiver unit 250 in accordance with the predetermined encoding scheme, to thereby generate decoded data; a carrier determination unit 246 for determining the presence or absence of a received RF signal carrier in accordance with the data indicative of the carrier intensity; a wakeup unit 270 for generating a wakeup signal in accordance with a time control sequence having been set up beforehand; a transmission antenna (ANT) 282 coupled to the transmitter unit 230; a receiving antenna (ANT) 284 coupled to the receiver unit 250; and a battery 290 for supplying power to these elements 210-270. The frequencies $f_1$ and $f_2$ may be 300 MHz and 301 MHz, respectively, for example. The frequencies $f_{2i}$ are 301 MHz, 302 MHz, ..., 305 MHz, for example.

The transmission output power of the transmitter unit (TX) 230 may be 1 mW for example. Alternatively, the antennas 282 and 284 may be composed of a single antenna.

The control unit 210 includes a random number generator 211 for generating a random number for selecting a time slot for transmission, a frequency changing unit 212 for changing the transmitting frequency $f_{2i}$, and a timing unit 213 for adjusting a timing for transmission.

The control unit 210 is always in an active state after power activation, and provides a memory control signal CTRL_M, a data generation control signal CTRL_ENC, a transmission control signal CTRL_TX, a reception control signal CTRL_RX, a data decode control signal CTRL_DEC, a carrier determination control signal CTRL_CS and a wakeup unit control signal to the memory 214, the data generation unit 220, the transmitter unit 230, the receiver unit 250, the data decoding unit 240, the carrier determination unit 246, and the wakeup unit 270, respectively. The control unit 210 may be a microprocessor or microcomputer that operates in accordance with a program.

The memory 214 stores information such as, the tag ID (ID_tag) of the RF ID tag 200, the current time-of-day information T, records of accesses performed by the reader/writer device 300, a control schedule and a time control sequence of the wakeup unit 270, the current remaining power level of the battery 290, a cycle period Tcs for sensing a carrier, a time period of processing for reception, a cycle period for transmission, and a time period of transmission. These pieces of information are stored and updated under the control of the control unit 210. The control unit 210 regularly or periodically detects the value of the supply voltage of the battery 290 to thereby determine the current remaining battery power level, and then stores information indicative of the remaining power level of the battery 290 into the memory 214.

The wakeup unit 270 includes a timer 274 for measuring time and thereby generating a time of day, and is always in an active state after the power activation of the RF ID tag 200. In accordance with the time of day of the timer 274 and with the control schedule and the time control sequence read out from the memory 214 and set up beforehand, the wakeup unit 270 provides a wakeup signal to the control unit 210 in a predetermined cycle Tcs for sensing a carrier, for example, of two seconds. When a control schedule and a time control sequence, the current time-of-day information T, and an instruction for correcting or updating the control schedule and the time control sequence are received as the received data from the reader/writer device 300, the control unit 210 corrects and updates the current time of day T, the control schedule and the time control sequence in the memory 214. The control unit 210 corrects the time of day of the timer 274 in accordance with the current time of day information T in the memory 214, and then writes and updates the current time of day T generated by the timer 274 in the memory 214.

The data generation unit 220 generates data in a predetermined format containing the tag ID (ID_tag) stored in the memory 214 and the like, then encodes the data in accordance with the predetermined encoding scheme, and then provides the data to the transmitter unit 230. The data may include the remaining battery power level and the access record. The data decoding unit 240 decodes the received encoded data in accordance with the predetermined encoding scheme, and then provides the decoded data to the data generation unit 220 and to the control unit 210. The carrier determination unit 246 receives, from the receiver unit 250, data indicative of the power intensity of the received RF signal carrier, thereby determines the presence or absence of a received carrier to provide the resultant determination to the control unit 210.

The reader/writer device 300 includes: a control unit 310 for transmitting and receiving data to and from a host computer (not shown); a memory 314; a data generation unit 320 for generating data in a predetermined format containing a command (CMD) and the like received from the control unit 310, then encoding the data in accordance with the predetermined encoding scheme, and thereby generating encoded data; a transmitter unit (TX) 330 for modulating the carrier with the baseband encoded data received from the data generation unit 320, and then transmitting an RF signal at a frequency $f_1$; a receiver unit (RX) 350 for receiving an RF signal at a frequency $f_2$ or RF signals at frequencies $f_{21}$-$f_{2n}$; a data decoding unit 340 for decoding the data received from the receiver unit 350 in accordance with the predetermined encoding scheme, thereby generating baseband decoded data, and then providing the decoded data to the control unit 310; a timer 374 for measuring time and thereby generating a time of day; a transmission antenna (ANT) 382 coupled to the transmitter unit 330; and a receiving antenna (ANT) 384 coupled to the receiver unit 350. The transmission output power of the transmitter unit (TX) 330 is 100 mW for example. Alternatively, the antennas 382 and 384 may be composed of a single antenna.

When the control unit 310 receives a command such as a tag ID or information request command (referred to simply as a tag ID request command hereinafter) from the host computer, it provides data containing the command to the data generation unit 320. The data may contain: the transmission frequency $f_2$ or $f_{2i}$ to be used in the RF ID tag 200; the reference current time-of-day information T; and a control schedule and a time control sequence which are new or updated. The command may contain an instruction of correcting or updating the time of the timer 274, in addition to the current time-of-day information T. Further, the command may contain an instruction of correcting or updating the schedule or the sequence stored in the memory 214, in addition to the control schedule or the time control sequence which are new or updated.

Figure 3:
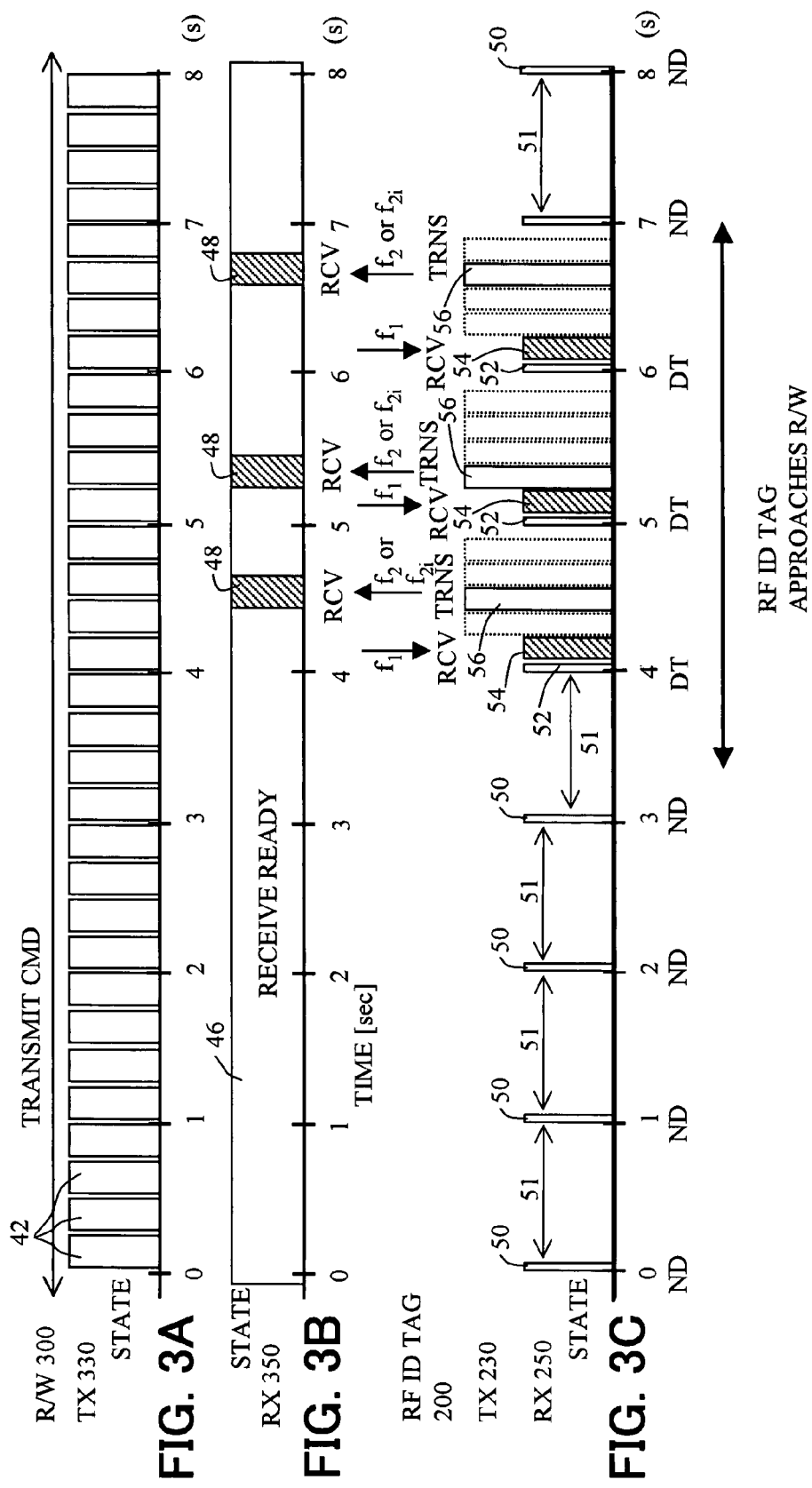
FIG. 3A shows a time chart of processing for transmission of an RF signal carrying a command transmitted from the reader/writer device.
FIG. 3B shows a time chart of a receive ready state and of processing for reception of a received RF signal in the reader/writer device.
FIG. 3C shows a time chart of carrier sensing, processing for reception of a received RF signal, and processing for transmission of an RF signal carrying a response, in the active-type RF ID tag.

FIG. 3A shows a time chart of processing for transmission 42 of an RF signal carrying a command transmitted from the reader/writer device 300. FIG. 3B shows a time chart of a receive ready state 46 and of processing for reception 48 of a received RF signal in the reader/writer device 300. FIG. 3C shows a time chart of carrier sensing 50 and 52, processing for reception 54 of a received RF signal, and processing for transmission 56 of an RF signal carrying a response, in the active-type RF ID tag 200.

Referring to FIG. 3A, the data generation unit 320 of the reader/writer device 300 generates data containing a tag ID request command for the RF ID tag received from the control unit 310, then encodes the data in accordance with the predetermined encoding scheme, and thereby generates encoded data. The transmitter unit 330 continually transmits the RF signal carrying the command in the successive time slots at short intervals in the processing for transmission 42.

Referring to FIG. 3C, in the active-type RF ID tag 200, in response to a wakeup signal from the wakeup unit 274, the control unit 210 enables the receiver unit 250 and the carrier determination unit 246 in the periods for carrier sensing 50 and 52 with a predetermined duration, for example of approximately 1-10 ms, occurring in a fixed cycle Tcs, for example of two seconds. This causes the receiver unit 250 to enter into a receive ready state. Then the enabled carrier determination unit 246 determines the presence or absence of a received carrier, in accordance with the data received from the receiver unit 250 indicating the power intensity of the received RF signal carrier. When the RF ID tag 200 is not located near the reader/writer device 300, the carrier determination unit 246 detects no carrier (ND), and hence determines the absence of a carrier. In a period of time 51 intervening between two adjacent carrier sensing periods 50, the RF ID tag 200 enters into a sleep mode of operation, during which only the control unit 210 and the wakeup unit 270 are enabled or powered on, while the other elements 214-250 are disabled or powered down. The time length of the sleep period of time 51 may be shorter than the length of time between the ending time of a carrier sensing period 50 and the starting time of the next carrier sensing period 50.

When the RF ID tag 200 approaches the reader/writer device 300 so that the receiver unit 250 of the RF ID tag 200 receives an RF signal, the carrier determination unit 246 detects the carrier of the RF signal (DT) in the period for carrier sensing 52, and hence determines the presence of a carrier. In response to the resultant determination of the presence of a carrier, the receiver unit 250 and the data decoding unit 240 are enabled in the time period for the subsequent processing for reception 54 with a predetermined duration, for example, of 100 ms. Then, the enabled receiver unit 250 receives and demodulates the RF signal to thereby reproduce encoded data containing a command. The enabled data decoding unit 240 decodes the data in accordance with the predetermined encoding scheme, then obtains the command from the data, and then provides the command to the control unit 210. In response to the command, the control unit 210 enables the data generation unit 220 and the transmitter unit 230 in a time period or slot of processing for transmission 56 selected at random within a predetermined period of time, each time slot having a predetermined duration, for example, of 100 ms. The enabled data generation unit 220 generates data containing the tag ID (ID_tag) and other required information retrieved from the memory 214, and then encodes the data in accordance with the predetermined encoding scheme. The enabled transmitter unit 230 modulates the carrier with the response data containing the tag ID, and then transmits the RF signal.

Referring to FIG. 3B, the receiver unit 350 of the reader/writer device 300 is always in the receive ready state 46. When the RF ID tag 200 approaches the reader/writer device 300 so that the receiver unit 350 receives an RF signal, the receiver unit 350 demodulates the received RF signal in the time period of processing for reception 48 and generates encoded data. The data decoding unit 350 decodes the encoded data in accordance with the predetermined encoding scheme, then reproduces the response data containing the tag ID, and then provides the reproduced tag ID to the control unit 310. The control unit 310 provides the tag ID to the host computer. The host computer processes the tag ID to use for monitoring and managing the article distribution or the persons.

In general, when the total time during which the RF ID tag 200 is not located near the reader/writer device 300 is significantly long, the active-type RF ID tag 200 is in a sleep mode of operation for the most time. This significantly reduces the power consumption of the active-type RF ID tag 200, and hence significantly increases the run time of the battery 290.

Figure 4:
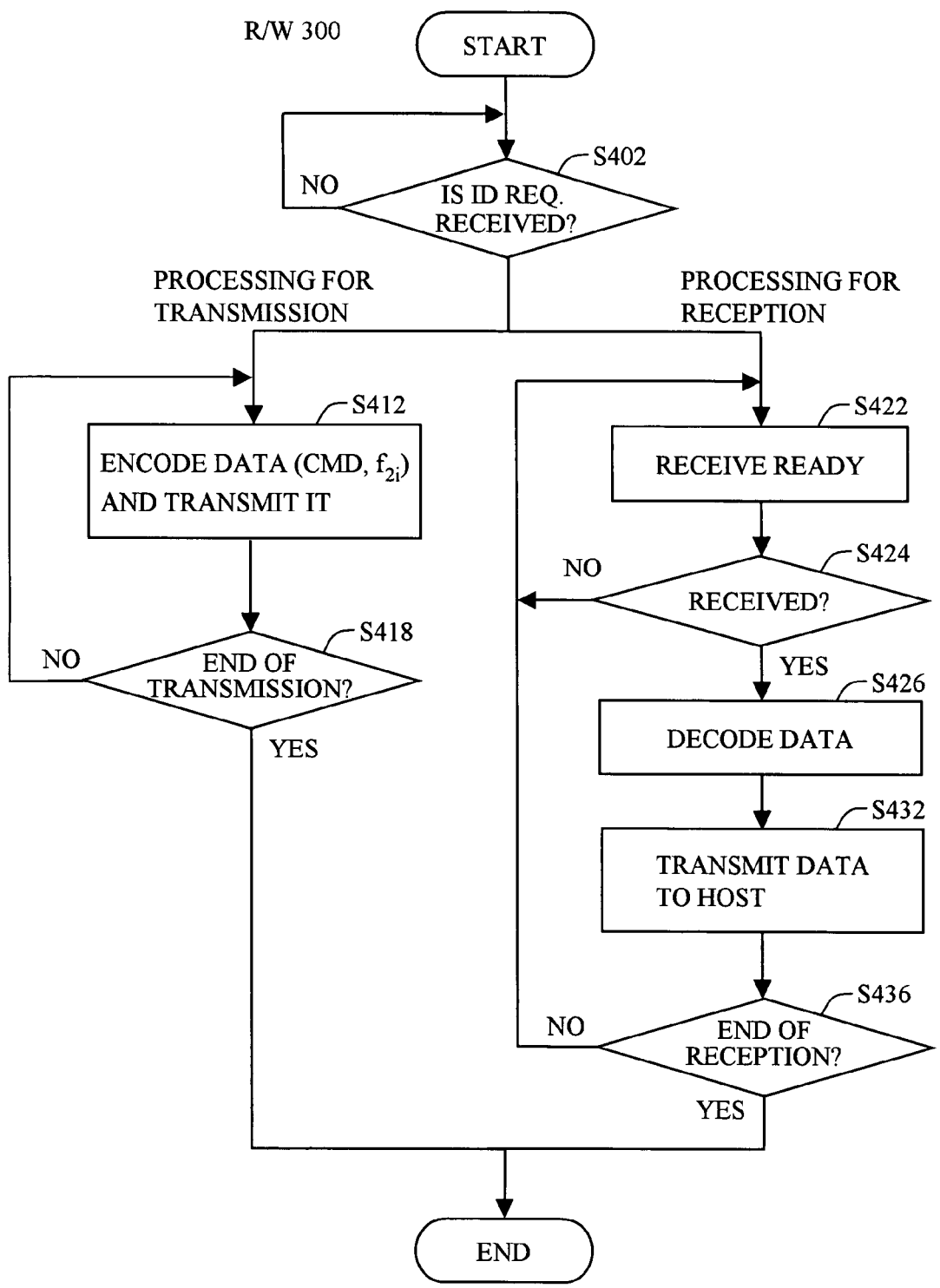
FIG. 4 shows a flow chart for the processing performed by the reader/writer device.
Figure 5A:
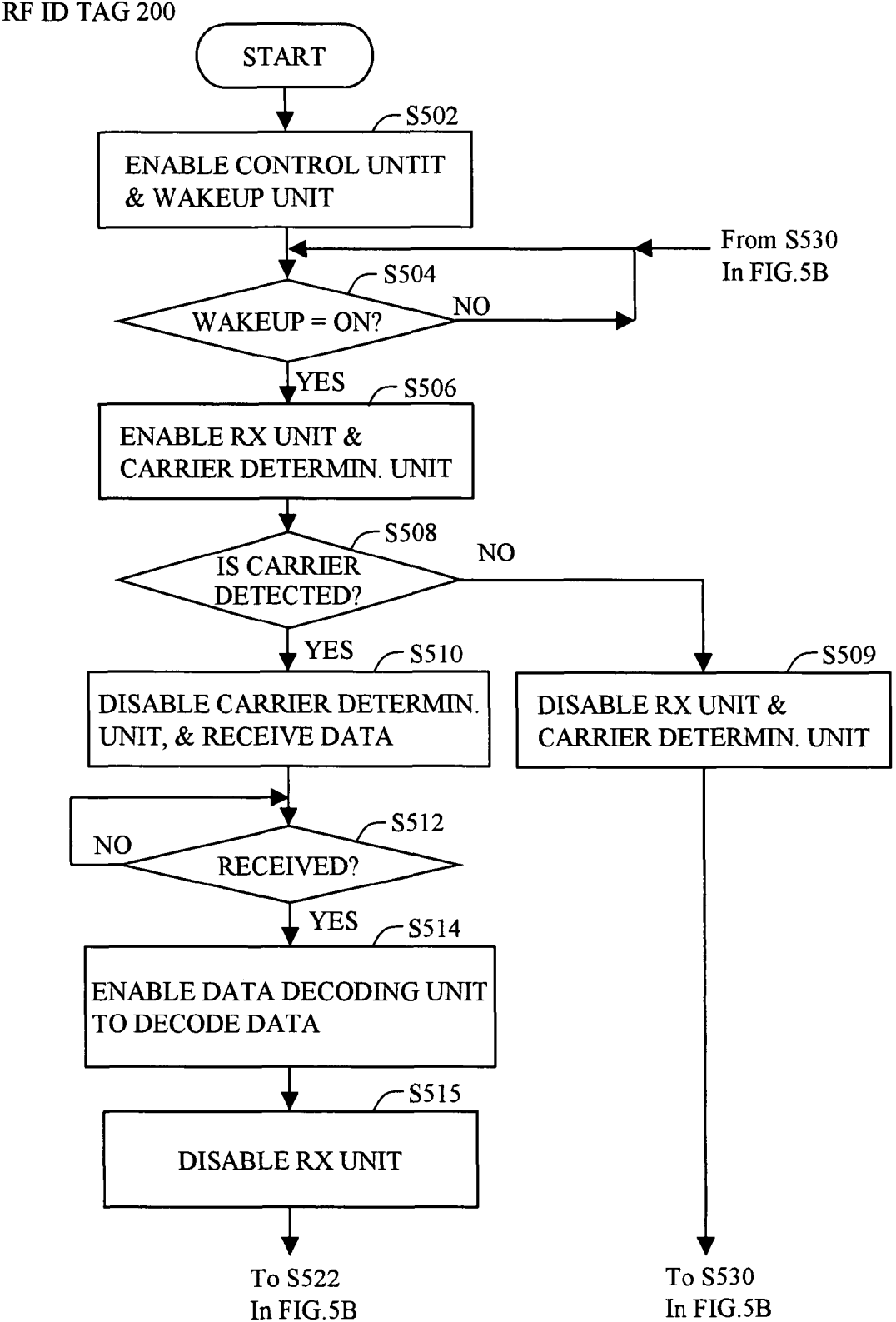
FIGS. 5A and 5B show a flow chart for the processing performed by the active-type RF ID tag.
Figure 5B:
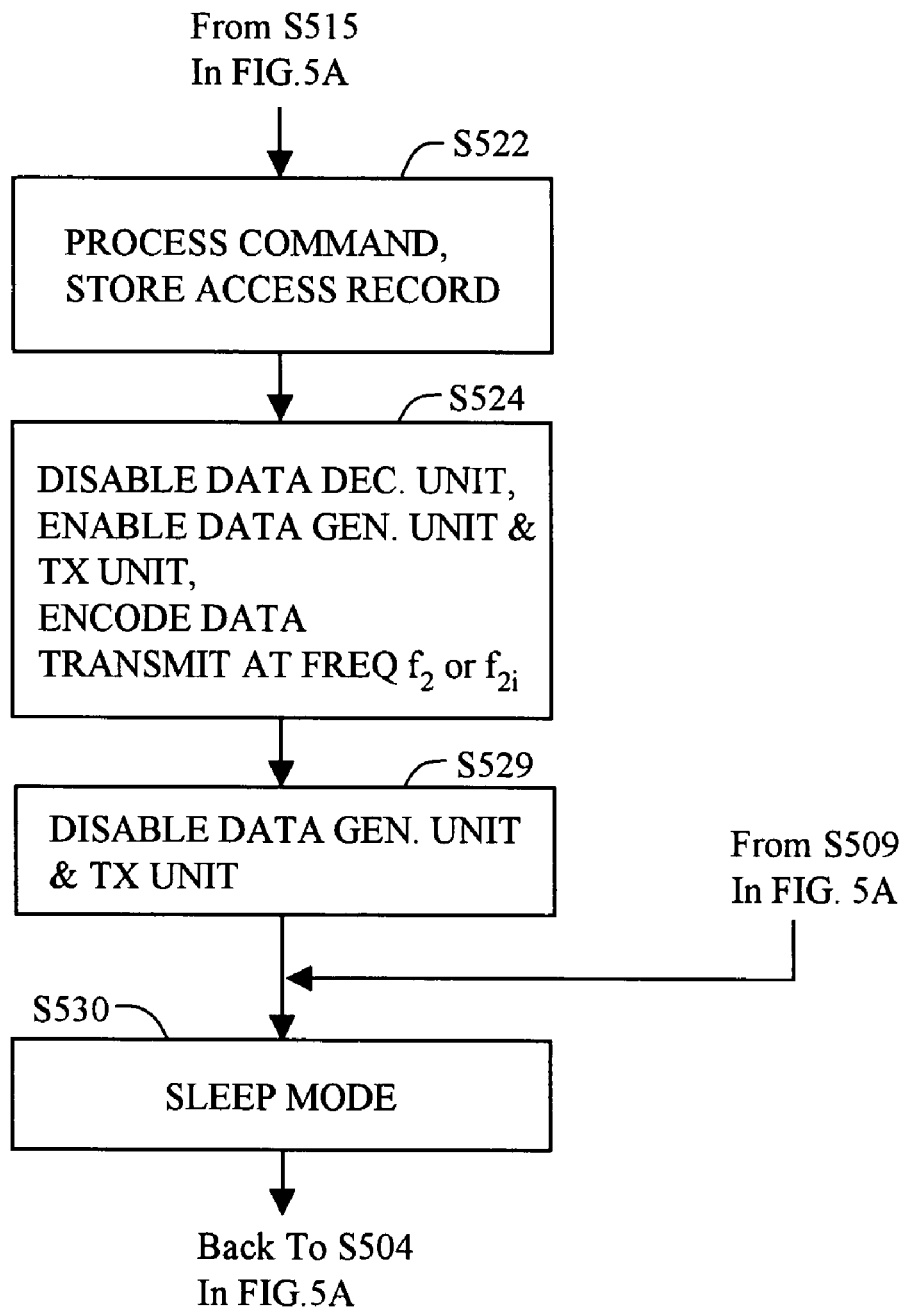

FIG. 4 shows a flow chart for the processing performed by the reader/writer device 300. FIGS. 5A and 5B show a flow chart for the processing performed by the active-type RF ID tag 200.

Referring to FIG. 4, at Step 402, the control unit 310 of the reader/writer device 300 determines whether a tag ID request command has been received from the host computer. The Step 402 is repeated until a request for the tag ID is detected. When a request for the tag ID is detected, the procedure proceeds to Step 412 for processing for transmission and to Step 422 for processing for reception.

At Step 412, the control unit 310 provides the ID request command and the related information to the data generation unit 320. The data generation unit 320 generates data containing the ID request command, and then encodes the generated data in accordance with a predetermined encoding scheme such as the NRZ (Non-Return-to-Zero) encoding system or the Manchester encoding system. The transmitter unit 330 modulates the carrier with the encoded data in the time slot of processing for transmission 42 of FIG. 3A, and then transmits the RF signal at a frequency $f_1$. The control unit 310 may incorporate, into the ID request command, data for specifying the transmission frequency $f_2$ or the variable transmission frequencies $f_{2i}$ used for a response to the ID request command; data indicative of time of day or time slots to be used for the variable transmission frequencies $f_{2i}$; data indicative of the current time of day T; and a control schedule and a time control sequence.

The reader/writer device 300 may change the frequencies $f_{2i}$ in the order in a time division manner, selecting one of the frequencies for every set of commands in respective transmission cycles $t_{RW-CY}$, the number of which corresponds to the time length of one or more cycles for sensing a carrier. This reduces the probability of collision between response RF signals transmitted from a plurality of RF ID tags which simultaneously approach to it. This increases the number of RF ID tags that the reader/writer device 300 can simultaneously identify.

At Step 418, the control unit 210 determines whether the processing for data transmission is to be terminated. If it is determined that the data transmission is terminated, the procedure exits this routine. If it is determined that the processing for data transmission is to be continued, the procedure returns to Step 412. In FIG. 3A, the data transmission is repeated and continued.

Referring to FIG. 5A, at Step 502, when the RF ID tag 200 is activated, the control unit 210 and the wakeup unit 270 are enabled. Once the RF ID tag 200 is activated, the control unit 210 and the wakeup unit 270 are always enabled, and hence in an active state. In accordance with the timer 274 and with the time control sequence, the wakeup unit 270 provides the control unit 210 with a wakeup signal indicative of the timing for carrier sensing of a received RF signal in a predetermined cycle Tcs. At Step 504, the control unit 210 determines whether the wakeup signal received from the wakeup unit 270 indicates an ON state. The control unit 210 repeats the Step 504 until the wakeup signal goes to the ON state.

If it is determined at Step 504 that the wakeup signal indicates the ON state, then the control unit 210 at Step 506 enables the receiver unit 250 and the carrier determination unit 246 for a short duration, for example, of approximately 1-10 ms. Then, the enabled receiver unit 250 enters into the state of being ready to receive an RF signal. In accordance with the data received from the receiver unit 250 that is indicative of the received carrier power, the enabled carrier determination unit 246 determines the presence or absence of a received RF signal carrier, and then provides the resultant determination to the control unit 210. At Step 508, in accordance with the resultant determination, the control unit 210 determines whether a carrier is detected. If it is determined that no carrier is detected, the control unit 210 at Step 509 disables the receiver unit 250 and carrier determination unit 246. After that, the procedure proceeds to Step 530.

If it is determined at Step 508 that a carrier is detected, then the control unit 210 at Step 510 disables carrier determination unit 246 and maintains to enable the receiver unit 250 in a further predetermined duration, for example of 100-200 ms, to receive an RF signal at a frequency $f_1$ carrying a command from the reader/writer device 300 (reception 54 in FIG. 3C), and then demodulates the received RF signal. At Step 512, the control unit 210 determines whether the receiver unit 250 has received the RF signal. The Step 512 is repeated until the reception of the RF signal is completed.

If it is determined at Step 512 that the RF signal has been received, then, the control unit 210 at Step 514 enables the data decoding unit 240, while the enabled data decoding unit 240 receives the received data from the receiver unit 250 under the control of the control unit 210, and then decodes the data in accordance with the predetermined encoding scheme. At Step 515, the control unit 210 disables the receiver unit 250.

Referring to FIG. 5B, at Step 522, the control unit 210 receives the decoded data containing the ID request command from the data decoding unit 240, then processes the received command contained in the decoded data, and then stores into the memory 214 the record of access performed by the reader/writer device 300. When a time correction command and the current time-of-day information T are contained in the received data, the control unit 210 corrects or updates the time of the timer 274 of the wakeup unit 270 into the time T.

At Step 524, the control unit 210 disables the data decoding unit 240, and in accordance with the ID request command, enables the data generation unit 220 and the transmitter unit 230 in a time slot selected in accordance with a random number from a predetermined number of time slots (e.g., five time slots each having a width of 100 ms) within the predetermined duration (e.g., 500 ms). Such a random number is generated by the random number generator unit 211. This selected time slot corresponds to the time period of the processing for transmission 56 of FIG. 3C. In accordance with the predetermined encoding scheme, the enabled data generation unit 220 encodes the data containing the tag ID (ID_tag) of the RF ID tag 200 read out from the memory 214, and then provides the data to the transmitter unit 230. The enabled transmitter unit 230 modulates the carrier with the data containing the tag ID, and then transmits via the antenna 284 an RF signal or RF signals at the predetermined frequency $f_2$ or specified frequency $f_{2i}$. The frequency $f_{2i}$ is changed by the frequency changing unit 212 of the control unit 210. The timing unit 213 adjusts a plurality of successive cycle time slots to occur in a predetermined cycle.

At Step 529, the control unit 210 disables the data generation unit 220 and the transmitter unit 230. At Step 530, the control unit 210 causes the RF ID tag 200 to enter into the sleep mode of operation. In the sleep mode, basically, the control unit 210 and the wakeup unit 270 solely are maintained in the enabled state, while the other elements 214-250 are disabled.

Referring back to FIG. 4, at Step 422, the control unit 310 enables the receiver unit 350 to enter into the receive ready state. The receiver unit 350 waits for the reception of an RF signal at a frequency $f_2$ (receive ready 46), and then receives an RF signal (processing for reception 48). At Step 424, the control unit 310 determines whether the receiver unit 350 has received the RF signal. The Step 424 is repeated until the reception is completed. If it is determined that the RF signal has been received, the receiver unit 350 at Step 426 provides the received data to the data decoding unit 340. The data decoding unit 340 decodes the received data in accordance with the predetermined encoding scheme to thereby reproduce the response data, and then provides notification of the data reception and the response data to the control unit 310.

At Step 432, the control unit 310 transmits the decoded data to the host computer. At Step 436, the control unit 310 determines whether the data receive ready state is to be terminated. If it is determined that the data receive ready state is to be terminated, the procedure exits this routine. If it is determined that the data receive ready state is to be continued, the procedure returns to Step 422. In FIG. 3B, the data receive ready state is repeated and continued.

Thus, the reader/writer device 300 performs transmission cyclically at sufficiently short intervals, and is always in the receive ready state. This reduces significantly the carrier sensing time of the RF ID tag 200. Thus, when the transmission and reception take place only several times a day, for example, for entry and exit control, the most operating time is used for carrier sensing, and hence the entire power consumption of the RF ID tag 200 is reduced significantly.

In a control schedule stored in the memory 214, the holidays and a period of time between a predetermined time point and another predetermined time point in the night-time (e.g., 6:00 pm to 6:00 am) of the weekdays may be specified, while a period of time between a predetermined time point and another predetermined time point in the daytime (e.g., 6:00 am to 6:00 pm) of the weekdays may be specified. In this case, the wakeup unit 270 generates no wakeup signal on the holidays and in the night-time, i.e., the RF ID tag 200 is in a deeper sleep mode of operation, and does not perform carrier sensing at all. In contrast, it performs carrier sensing in a predetermined cycle (e.g., of one second) in the daytime of the weekdays.

Under the control of the control unit 210, the wakeup unit 270 may generate a wakeup signal depending on the remaining power level of the battery 290 stored in the memory 214. In this case, when the remaining battery power level is sufficient, carrier sensing may be performed in a relatively short cycle (e.g., of one second), while, when the remaining battery power level goes below a threshold, carrier sensing may be performed in a relatively long cycle (e.g., of two seconds). Further, data representative of the remaining battery power level may be incorporated into the response data of the RF ID tag 200, and then provided to the host computer via the reader/writer device 300, so that the host computer displays a warning of battery run-out to a user.

When the records of accesses performed by the reader/writer devices are stored as a log of accesses in the memory 214 as described above, even an unauthorized access performed by a reader/writer device other than the reader/writer device 300 can be recorded as the log. Thus, when the log of accesses is read by the reader/writer device 300 and then analyzed by the host computer, the unauthorized access can be recognized.

Figure 6:
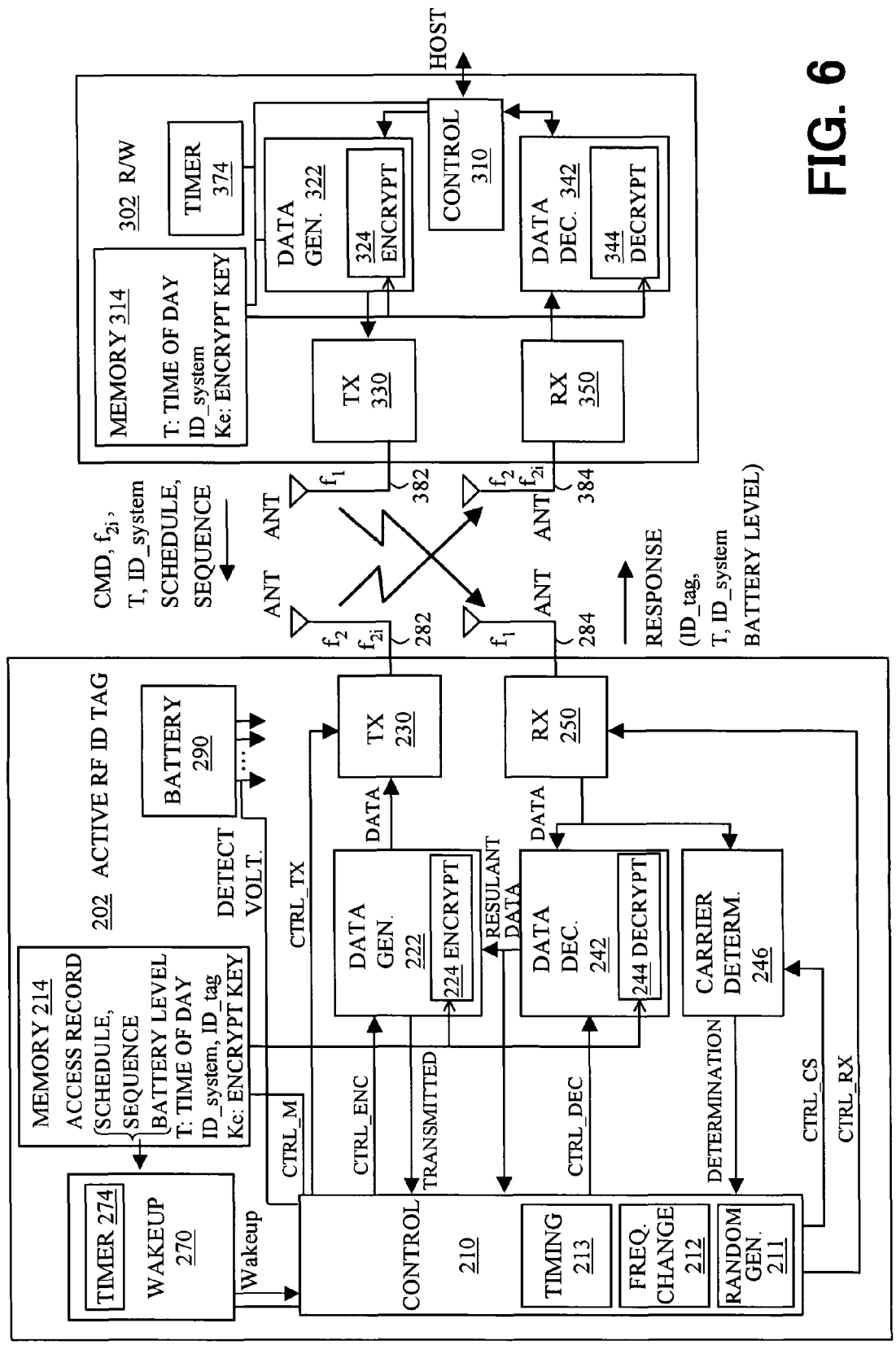
FIG. 6 shows modification of the configurations of FIG. 2, and illustrates the configurations of a more secure active-type RF ID tag and of a reader/writer device.

FIG. 6 shows modification of the configurations of FIG. 2, and illustrates the configurations of a more secure active-type RF ID tag 202 and of a reader/writer device 302. In these configurations, the data transmitted between the RF ID tag 202 and the reader/writer device 302 is encrypted, and the received data is decrypted to be used for authentication.

The RF ID tag 202 includes a data generation unit 222 in place of the data generation unit 220 in the RF ID tag 200 of FIG. 2, and includes a data decoding unit 242 in place of the data decoding unit 240 of FIG. 2. In addition to the tag ID (ID_tag), the memory 214 of the RF ID tag 202 stores the current time-of-day information T for authentication, a system ID (ID_system) for authentication, and an encryption/decryption key Ke. The memory 214 provides these pieces of information to the data generation unit 222 and the data decoding unit 242. The current time-of-day information T for authentication, the system ID for authentication, and the encryption/decryption key Ke described here are transmitted to the RF ID tag 202 by the reader/writer device 302 beforehand, and then written into the memory 214 by the control unit 210 beforehand. The data generation unit 222 includes an encryption unit 224 for encrypting the data to be transmitted, with the encryption key Ke stored in the memory 214 in accordance with a predetermined cryptosystem. The data decoding unit 242 includes a decryption unit 244 for decrypting the received data with the encryption/decryption key Ke in accordance with the predetermined cryptosystem. The other elements in the configuration of the RF ID tag 202 are similar to those of the RF ID tag 200, and hence are not described again. The system ID indicates a common ID shared by the same group consisting of the reader/writer device 302 and a plurality of RF ID tags including the RF ID tag 202. The common key cryptosystem is employed as the predetermined cryptosystem herein. Alternatively, the public key cryptosystem may be employed.

The reader/writer device 302 includes a data generation unit 322 in place of the data generation unit 320 in the reader/writer device 300 of FIG. 2, and includes a data decoding unit 342 in place of the data decoding unit 340 of FIG. 2. The memory 314 of the reader/writer device 302 stores the current time-of-day information T for authentication, the system ID (ID_system) for authentication, and an encryption/decryption key Ke. The data generation unit 322 includes an encryption unit 324 for encrypting the data to be transmitted, with the encryption key Ke stored in the memory 314 in accordance with the predetermined cryptosystem. The data decoding unit 342 includes a decryption unit 344 for decrypting the received data with the encryption/decryption key Ke in accordance with the predetermined cryptosystem. The other elements in the configuration of the reader/writer device 302 are similar to those of the reader/writer device 300, and hence are not described again.

Figure 7:
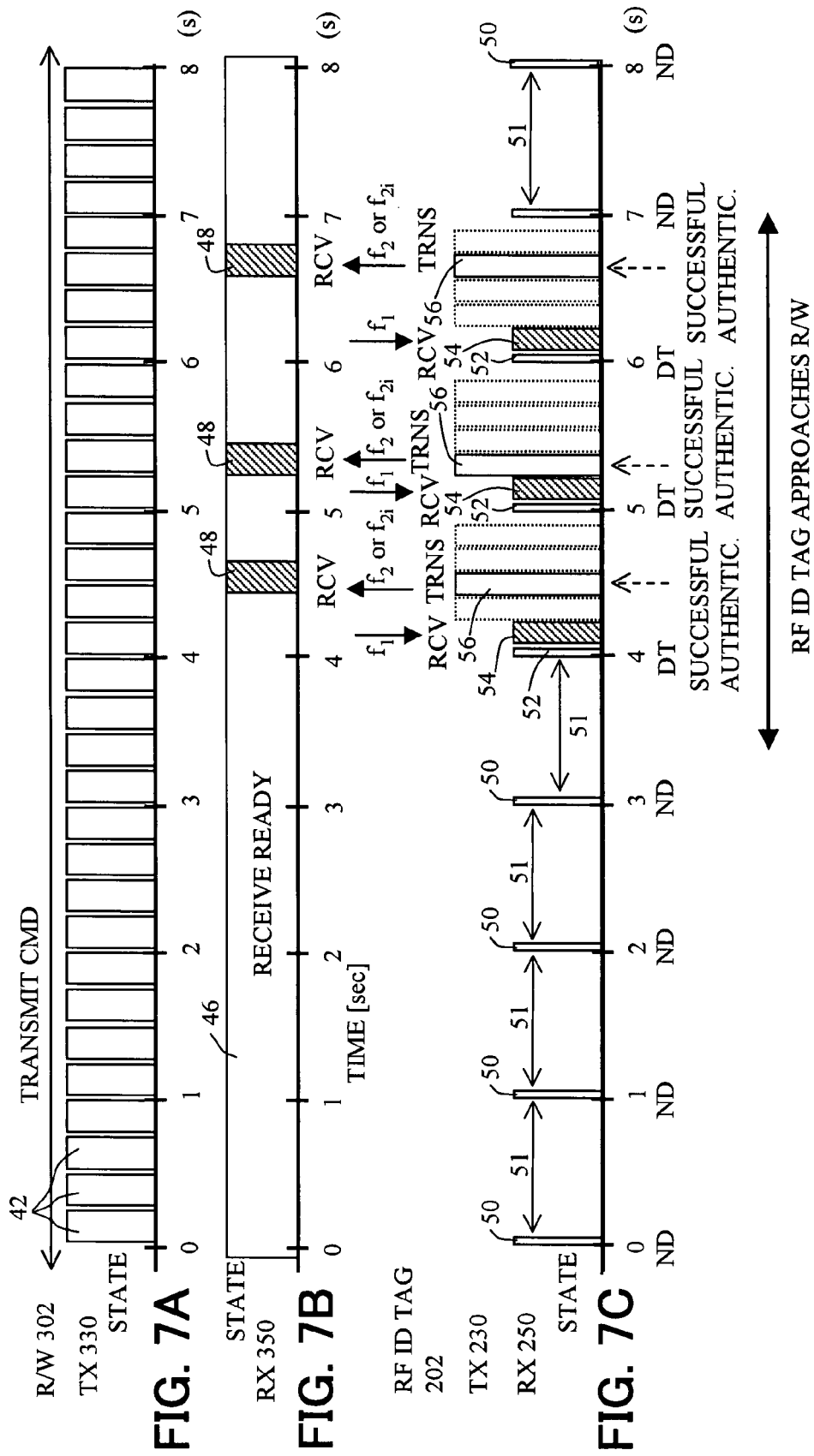
FIG. 7A shows a time chart of processing for transmission for an RF signal carrying a command (CMD) transmitted from the reader/writer device.
FIG. 7B shows a time chart of a receive ready state and of processing for reception of a received RF signal in the reader/writer device.
FIG. 7C shows a time chart of carrier sensing, processing for reception of received RF signals, and processing for transmission of an RF signal carrying a response in the case of successful authentication, in the active-type RF ID tag.

FIG. 7A shows a time chart of processing for transmission 42 for an RF signal carrying a tag ID request command (CMD) transmitted from the reader/writer device 302. FIG. 7B shows a time chart of a receive ready state 46 and of processing for reception 48 of a received RF signal in the reader/writer device 302. FIG. 7C shows a time chart of carrier sensing 50 and 52, processing for reception 54 and 55 of received RF signals, and processing for transmission 56 of an RF signal carrying a response in the case of successful authentication, in the active-type RF ID tag 202.

Referring to FIG. 7A, the data generation unit 322 of the reader/writer device 302 generates data containing a tag ID request command for the RF ID tag that is received from the control unit 310, and encodes the data in accordance with the predetermined encoding scheme to thereby generate encoded encrypted data. The other transmission operation of the reader/writer device 302 is similar to that of the reader/writer device 300 of FIG. 3A.

Referring to FIG. 7C, in the active-type RF ID tag 202, the operations of the receiver unit 250 and carrier determination unit 246 are similar to those shown in FIG. 3C. Thus, in response to a wakeup signal from the wakeup unit 274, the receiver unit 250 and the carrier determination unit 246 are enabled by the control unit 210 in the periods for carrier sensing 50 and 52 with the predetermined duration occurring in the fixed cycle, so that the enabled receiver unit 250 enters into a receive ready state.

In response to the resultant determination of the presence of a carrier (DT) made by carrier determination unit 246, the receiver unit 250 and the data decoding unit 242 are enabled in a predetermined time period for the subsequent processing for reception 54 and 55 with the predetermined duration. The enabled receiver unit 250 receives and demodulates the RF signal, to thereby reproduce encoded encrypted data containing the command. The enabled data decoding unit 242 decodes the data in accordance with the predetermined encoding scheme, then decrypts the encrypted data with the encryption/decryption key Ke in accordance with the predetermined cryptosystem to thereby reproduce the command, and then provides the command to the control unit 210. In response to reception of the command, the control unit 210 authenticates the reader/writer device 302 in accordance with the time-of-day information T and the system ID contained in the command.

When the authentication has been successful, the data generation unit 222 and the transmitter unit 230 are enabled in a time slot of processing for transmission 56 selected at random within a predetermined period of time, each time slot having a predetermined duration. The data generation unit 222 encrypts data containing the tag ID (ID_tag), the time-of-day information T, and the system ID (ID_system) retrieved from the memory 214, with the encryption key Ke in accordance with the predetermined cryptosystem, and then encodes the encrypted data in accordance with the predetermined encoding scheme. The transmitter unit 230 modulates the carrier with the encrypted response data containing the tag ID, and then transmits the RF signal. When the authentication has been unsuccessful, the processing is terminated without generating or transmitting the data.

Referring to FIG. 7B, the receiver unit 350 of the reader/writer device 302 is always in the receive ready state 46. When the RF ID tag 202 approaches the reader/writer device so that the receiver unit 350 receives an RF signal, the receiver unit 350 demodulates the received RF signal in the time period of processing for reception 48, and then reproduces encoded encrypted data. The data decoding unit 342 decodes the encoded encrypted data in accordance with the predetermined encoding scheme, then decrypts the decoded encrypted data with the encryption/decryption key Ke in accordance with the predetermined cryptosystem to thereby reproduce the response data containing the tag ID, and then provides the reproduced response to the control unit 310. In response to the received and reproduced response, the control unit 310 authenticates the RF ID tag 202 in accordance with the time-of-day information T and the system ID contained in the response, and then provides the tag ID and other information to the host computer.

In general, when the reader/writer device 302 and the RF ID tag 202 encrypt the data to be transmitted and perform mutual authentication in accordance with the time-of-day information T and the system ID as described above, the data transmitted by the reader/writer device 302 and the RF ID tag 202, which is intercepted by a third party, has little risk of being decrypted and used improperly. This enhances the security of the reader/writer device 302 and the RF ID tag 202.

Figure 8:
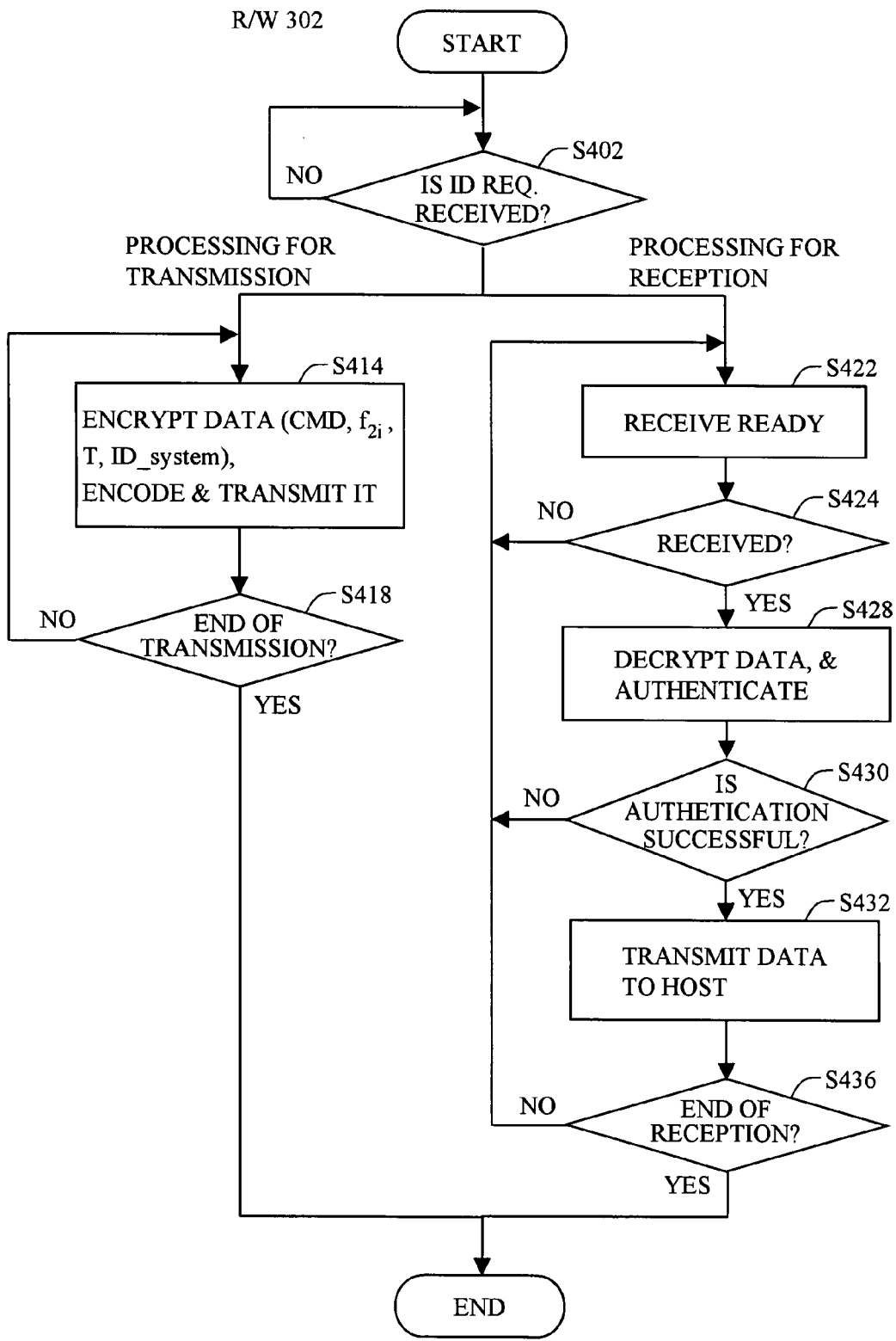
FIG. 8 shows a flow chart for the processing performed by the reader/writer device.
Figure 9A:
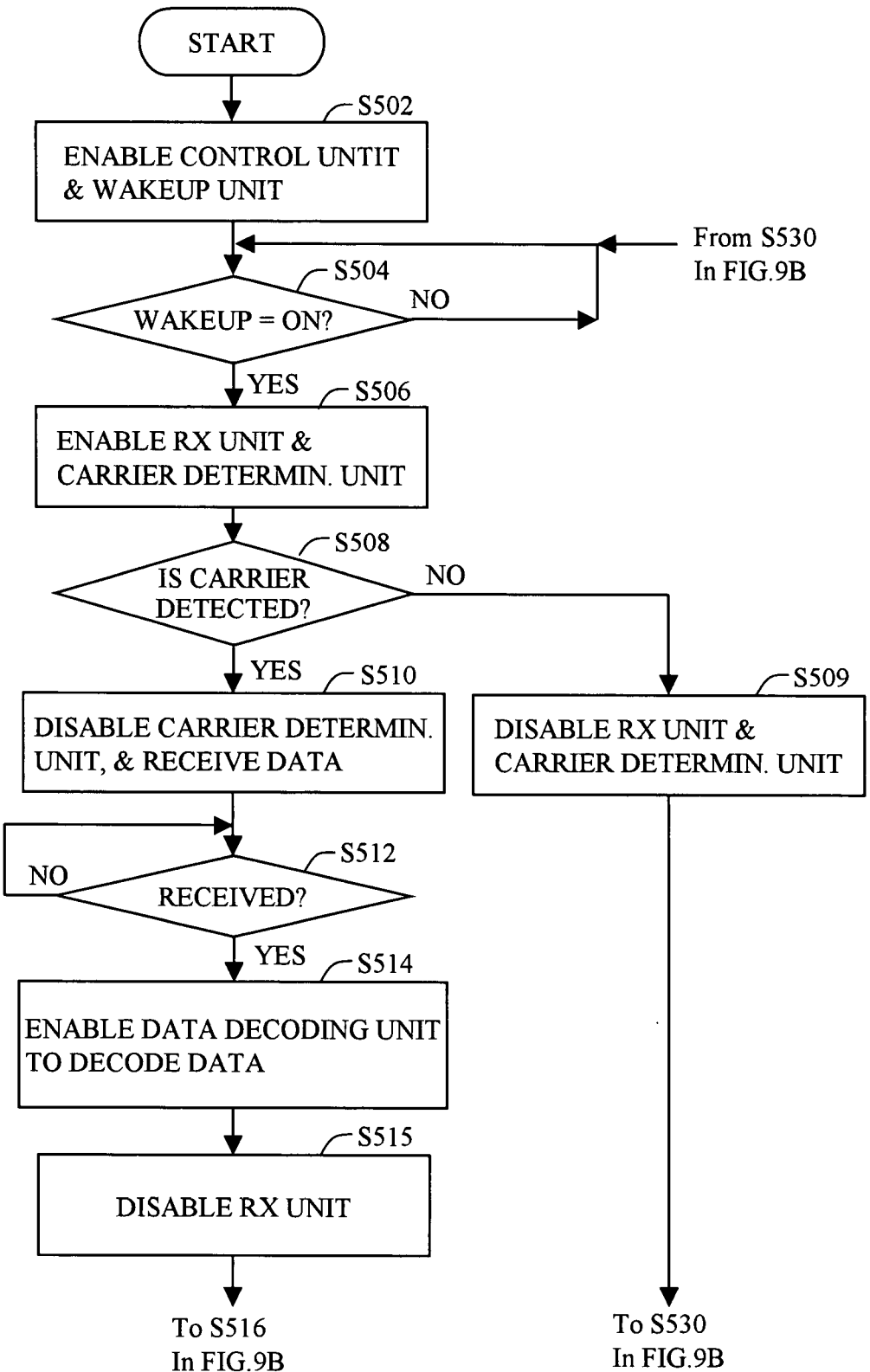
FIGS. 9A and 9B show a flow chart for the processing performed by the active-type RF ID tag.
Figure 9B:
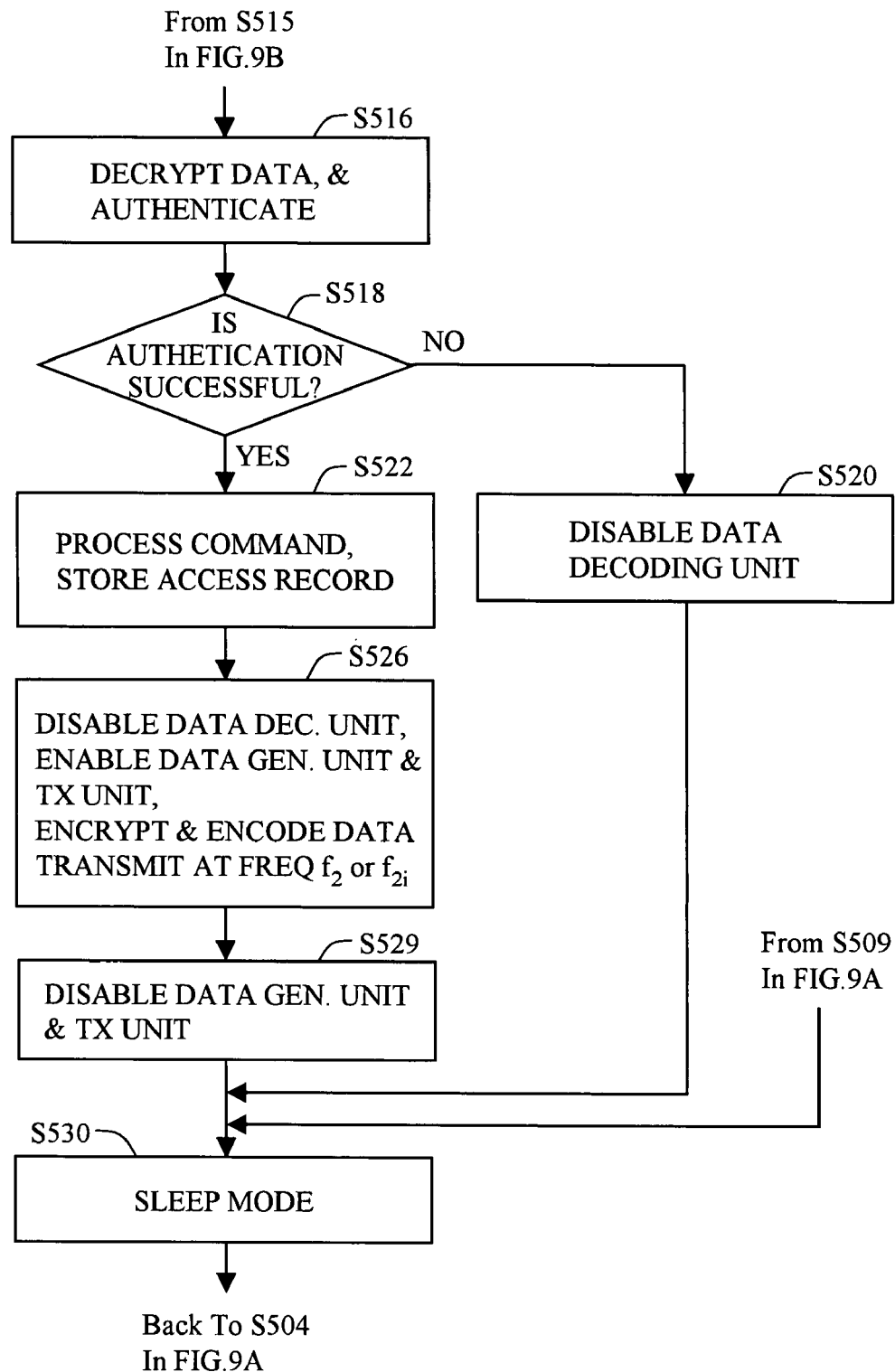

FIG. 8 shows a flow chart for the processing performed by the reader/writer device 302. FIGS. 9A and 9B show a flow chart for the processing performed by the active-type RF ID tag 202.

Referring to FIG. 8, Step 402 is similar to that of FIG. 4, and hence is not described again. At Step 414, the control unit 310 provides the ID request command to the data generation unit 322. The data generation unit 322 encrypts data containing the ID request command received from the control unit 310 and containing the current time-of-day information T and the system ID (ID_system) retrieved from the memory 314, with the encryption key Ke retrieved from the memory 314 in accordance with a predetermined cryptosystem, such as the DES (Data Description Standard), the Triple DES or the AES (Advanced Encryption Standard). Then, the data generation unit 322 encodes the encrypted data to thereby generate encoded data. The transmitter unit 332 modulates the carrier with the encrypted data, and then transmits the RF signal at the frequency $f_1$ (processing for transmission 42 in FIG. 7A). Step 418 is similar to that of FIG. 4, and hence is not described again.

Referring to FIG. 9A, Steps 502 through 515 are similar to those of FIG. 5, and hence are not described again.

Referring to FIG. 9B, at Step 516, under the control of the control unit 210, the data decoding unit 242 decrypts the decoded data with the encryption/decryption key Ke retrieved from the memory 214 in accordance with the predetermined cryptosystem, and then provides the decrypted data containing the command, the tag ID (ID_tag), the time-of-day information T, and the system ID (ID_system) to the control unit 210. The data may contain a control schedule and a time control sequence. Upon receiving the data, the control unit 210 compares the decrypted time-of-day T and system ID with the stored time-of-day T and system ID in the memory 214, to determine whether the decrypted time information and ID match with the stored time information and ID, in order to authenticate the reader/writer device 302.

At Step 518, the control unit 210 determines whether the authentication has been successful. If it is determined that authentication has been unsuccessful, the control unit 210 at Step 520 disables the data decoding unit 242. Then, the procedure proceeds to Step 530 of FIG. 9B.

If it is determined at Step 518 that the authentication has been successful, then the control unit 210 at Step 522 receives from the data decoding unit 242 the decrypted data containing the ID request command, then processes the decrypted received command contained in decoded data, and then stores into the memory 214 the record of access from the reader/writer device 302.

At Step 526, in accordance with the ID request command, the control unit 210 enables the data generation unit 222 and the transmitter unit 230 in a time slot selected at random in accordance with a random number from a predetermined number of time slots within a predetermined period of time. This selected time slot corresponds to the time period of the processing for transmission 56 of FIG. 7C. The data generation unit 222 encrypts data containing the tag ID (ID_tag) of the RF ID tag 202, the time-of-day information T and the system ID (ID_system) read out from the memory 214, with the encryption key Ke in accordance with the predetermined cryptosystem, then encodes the encrypted data in accordance with the predetermined encoding scheme, and then provides the encoded encrypted data to the transmitter unit 230. The transmitter unit 230 modulates the carrier with the encoded encrypted data, and then transmits the RF signal at a frequency $f_2$ via the antenna 284 (transmission 56 in FIG. 7C). Steps 528 and 530 are similar to those of FIG. 5, and hence are not described again.

Referring back to FIG. 8, Steps 422 through 424 are similar to those of FIG. 4, and hence are not described again. At Step 428, the receiver unit 350 provides the received data to the data decoding unit 342. The data decoding unit 342 decodes the received data in accordance with the predetermined encoding scheme, then decrypts the decoded data in accordance with the predetermined cryptosystem, and then provides the data reception and the decrypted data to the control unit 310. The control unit 310 compares the decrypted time T and system ID with the stored time T and system ID in the memory 314, to determine whether the decrypted time information and ID match with the stored time information and ID, in order to authenticate the RF ID tag 202. Even if there is an error between the received time-of-day information T and the stored time-of-day information T that falls within a predetermined range (e.g., ±0.5 seconds) in the control unit 210 of the RF ID tag 202 and in the control unit 310 of the reader/writer device 302, they may determine that the received time-of-day information matches with the stored time-of-day information.

At Step 430, the control unit 310 determines whether the authentication has been successful. If it is determined that the authentication has been unsuccessful, the procedure returns to Step 422. If it is determined that the authentication has been successful, the procedure proceeds to Step 432. Step 436 is similar to that of FIG. 4, and hence is not described again.

The active-type RF ID tag and the reader/writer device described above are also disclosed by the inventors of the present invention and other persons in the U.S. patent application Ser. No. 11/247,333 filed on Oct. 12, 2005, the entirety of which is incorporated herein by reference.

When the active-type RF ID tags 200 and 202 continue to be located close to the reader/writer devices 300 and 302 for a long time, the active-type RF ID tags 200 and 202 repeat the reception and the transmission of RF signals. Thus, a large battery power is dissipated, and hence the battery run time of each of the active-type RF ID tags becomes short.

The inventors have recognized that the reader/writer devices 300 and 302 may be adapted to, upon detection of the active-type RF ID tags 200 and 202, transmit, for a predetermined period of time, an RF signal at a particular frequency carrying a tag ID request command to the RF ID tags cyclically at sufficiently short intervals, and to be continuously ready to receive an RF signal at another frequency carrying tag information such as a tag ID transmitted by the RF ID tags at another frequency. This significantly reduces the power consumption of each of the RF ID tags 200 and 202, and hence extends the battery run time thereof.

Figure 10:
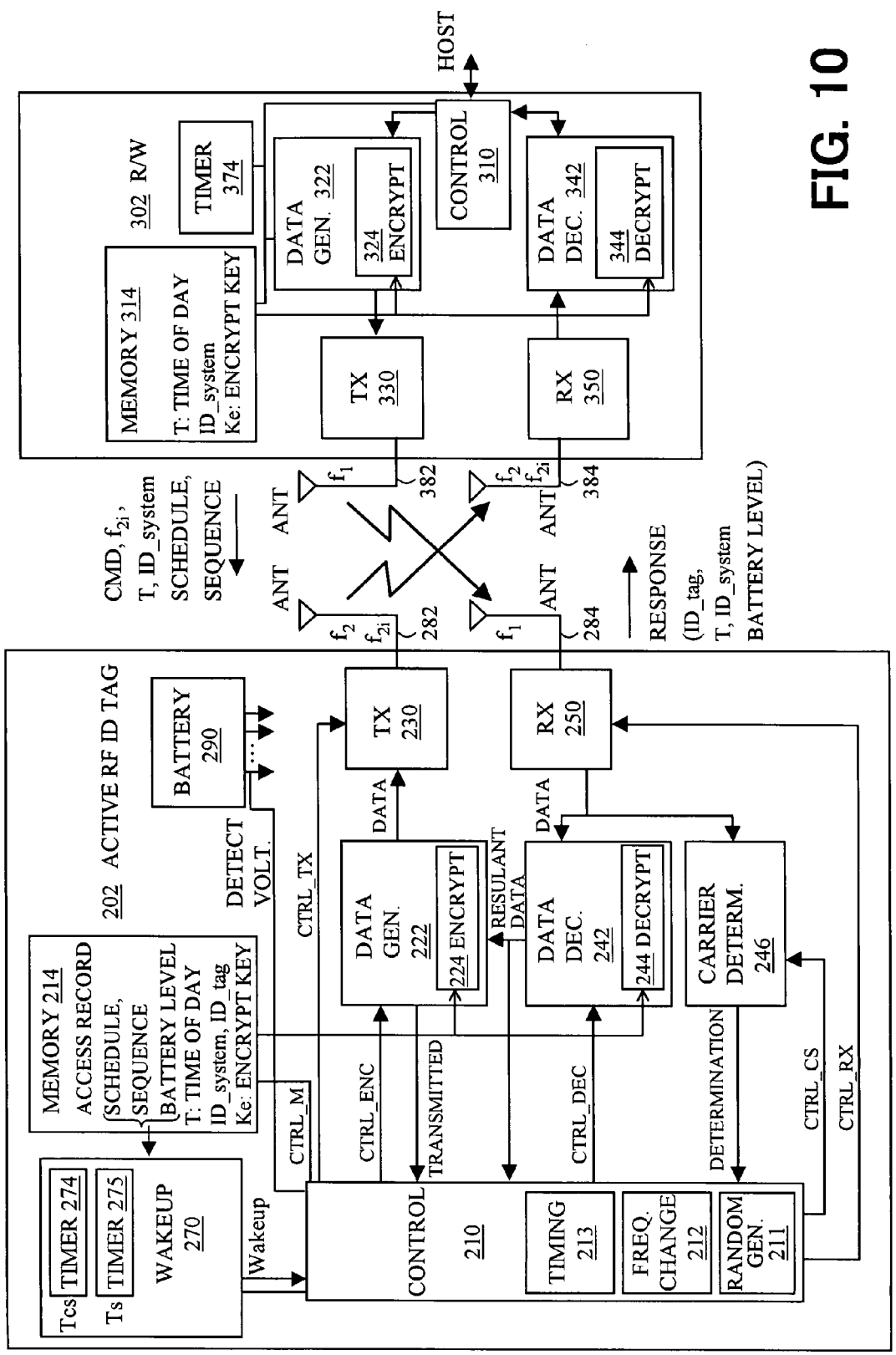
FIG. 10 shows configurations of an active-type RF ID tag and of a reader/writer device, in accordance with an embodiment of the present invention.

FIG. 10 shows configurations of an active-type RF ID tag 204 and of a reader/writer device 304, in accordance with an embodiment of the present invention.

In FIG. 10, the memory 314 of the reader/writer device 304 stores a list LID of the tag IDs of active-type RF ID tags which have been received from the host computer and/or the active-type RF ID tags. The wakeup unit 270 of the active-type RF ID tag 204 includes a carrier sensing timer 274 for measuring time and producing time of the day, and a tag information transmission timer 275 for measuring time and producing time of the day. After the RF ID tag 200 is powered on, the wakeup unit 270 becomes continuously enabled, and provides wakeup signals to the control unit 210 in a predetermined carrier sensing cycle Tcs and a transmission cycle Ts, respectively, in accordance with the time of the day of the timers 274 and 275 and with a preset control schedule and a preset time control sequence which are read out from the memory 214. The other elements in the configurations of the active-type RF ID tag 204 and the reader/writer device 304 are similar to those of the RF ID tag 202 and the reader/writer device 302 shown in FIG. 6.

Figure 11:
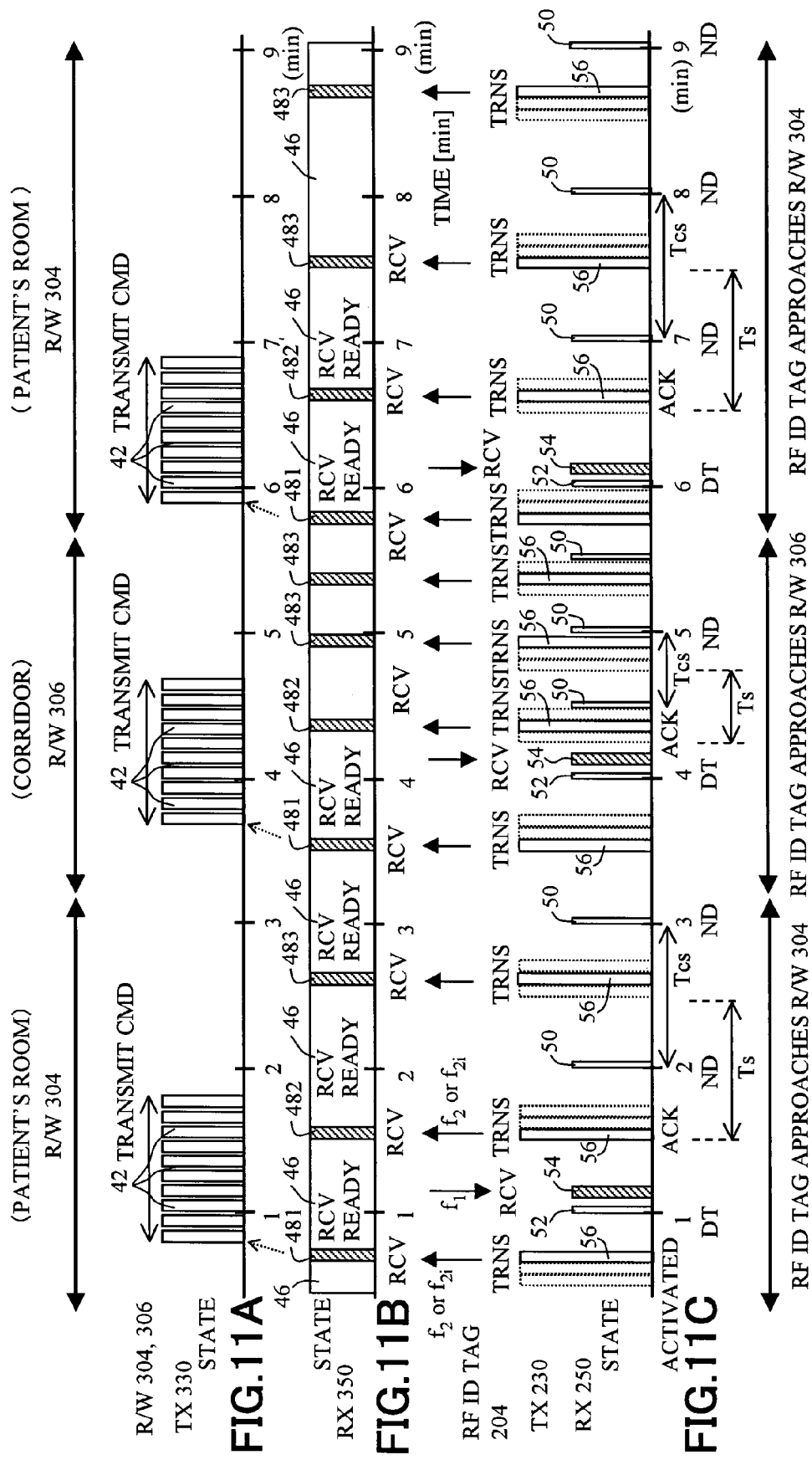
FIG. 11A shows
FIG. 11B shows a time chart of a receive ready state and of processing for reception of a received RF signal in the reader/writer devices.
FIG. 11C shows a time chart of carrier sensing, processing for reception of a received RF signal, and processing for transmission of an RF signal carrying data containing tag information such as a tag ID or a response, in the active-type RF ID tag.

FIG. 11A shows a time chart of processing for transmission 42 of an RF signal carrying data containing a tag ID request or an information request command (CMD) transmitted by reader/writer devices 304 and 306 arranged at different positions. FIG. 11B shows a time chart of a receive ready state 46 and of processing for reception 481 to 483 of a received RF signal in the reader/writer devices 304 and 306. FIG. 11C shows a time chart of carrier sensing 50 and 52, processing for reception 54 of a received RF signal, and processing for transmission 56 of an RF signal carrying data containing tag information such as a tag ID or a response, in the active-type RF ID tag 204.

For detecting the presence of a user in a place, the reader/writer device 304 is arranged, for example, in a patient's room of a hospital where the user may stay for a long time. The reader/writer device 306 has a configuration similar to that of the reader/writer device 304, and is arranged, for example, in a corridor of the hospital where the user passes temporarily, for detecting the temporary passage of the user. It is assumed that the user who stays in the hospital carries the active-type RF ID tag 204.

Referring to the left of FIG. 11C, the RF ID tag 204 is activated, when, for example, the user enters into the patient's room first or gets up everyday in the morning in the patient's room. When the active-type RF ID tag 204 is activated, the wakeup unit 270 (the timers 275 and 274) generates respective wakeup signals. In response to the wakeup signal of the wakeup unit 270 (the timer 275), the control unit 210 enables the data generation unit 222 and the transmitter unit 230 in a time period or slot of processing for transmission 56 selected at random within each of predetermined periods of time occurring in a longer cycle Ts of, for example, one (1) minute, each time slot having a predetermined duration of, for example, 100 ms. Under the control of the control unit 210, the enabled data generation unit 222 in the active-type RF ID tag 204 encrypts the data to be transmitted containing tag information such as the tag ID stored in the memory 214, with the encryption key Ke in accordance with the predetermined cryptosystem, and then encodes the encrypted data in accordance with the predetermined encoding scheme. Then, the enabled transmitter unit 230 transmits an RF signal at the frequency $f_2$ carrying the encoded encrypted data. In response to the wakeup signal of the wakeup unit 270 (timer 274), the receiver unit 250 and the carrier determination unit 246 are enabled under the control of the control unit 210 to sense a carrier of a received RF signal at the frequency $f_1$, in the periods for carrier sensing 50 and 52 with a predetermined duration of, for example, 1 ms to 10 ms, occurring in a long carrier sensing cycle Tcs of, for example, one (1) minute.

Referring to FIG. 11B, the receiver unit 350 of the reader/writer device 304 is always in a receive ready state 46. Thus, when the RF ID tag 204 approaches the reader/writer device 304 so that the receiver unit 350 receives an RF signal, the receiver unit 350 demodulates the received RF signal in the time period of processing for reception 481 and generates encoded data. The data decoding unit 342 decodes the encoded data in accordance with the predetermined encoding scheme, then decrypts the decoded data in accordance with the predetermined cryptosystem to thereby reproduce the received data containing the tag ID, and then provides the reproduced tag information such as the tag ID to the control unit 310. In response to the reception of the tag ID, the control unit 310 searches the tag ID list LID in the memory 314 for the received tag ID. When a tag ID corresponding to the received tag ID is not recorded in the list LID, the control unit 310 requests the data generation unit 324 to transmit a tag ID or information request command.

Referring to FIG. 11A, in response to the reception of the tag ID which is not recorded in the list LID, the control unit 310 enables the transmitter unit 330 to cyclically transmit an RF signal at the frequency $f_1$ carrying data such as an ID tag request command in the successive time slots at sufficiently short intervals in the processing for transmission 42, during a predetermined period of time of, for example, one (1) minute. The command contains a value of the cycle period or interval Tcs for the carrier sensing 50 and 52 and a value of the cycle period or interval Ts of the time periods for processing for transmission 56, for the RF ID tag 204, and contains a request for changing or updating the values of the cycle periods Tcs and Ts.

Referring back to FIG. 11C, when the receiver unit 250 of the RF ID tag 204 receives an RF signal at the frequency $f_1$ in the period for carrier sensing 52, the carrier determination unit 246 detects the carrier of the RF signal (DT) and hence determines the presence of a received RF signal carrier. In response to the resultant determination of the presence of a carrier, the receiver unit 250 and the data decoding unit 240 are enabled in the time period for the subsequent processing for reception 54 with a predetermined duration of, for example, 100 ms. The enabled receiver unit 250 receives and demodulates the RF signal to thereby reproduce encoded data containing a tag ID request command. The enabled data decoding unit 240 decodes the encoded data in accordance with the predetermined encoding scheme, then decrypts the decoded data in accordance with the predetermined cryptosystem to thereby reproduce the command, and then provides the command to the control unit 210.

In response to the command, the control unit 210 sets up the values of the cycle period Tcs for carrier sensing 50 and 52 and the cycle period Ts of the time periods for processing for transmission 56 contained in the command, into the timers 274 and 275, respectively. After that, the control unit 210 causes the receiver unit 250 and the carrier determination unit 246 to perform carrier sensing 50 and 52 in the set cycle Tcs, and causes the data generation unit 222 and the transmitter unit 230 to perform processing for transmission 56 within each of the predetermined periods of time occurring in the set cycle Ts. The control unit 210 enables the data generation unit 220 and the transmitter unit 230 in a time period of processing for transmission 56 selected at random within the next predetermined period of time. The enabled data generation unit 222 generates transmission data containing the tag ID retrieved and other required information from the memory 214, then encrypts the transmission data in accordance with the predetermined cryptosystem, and then encodes the encrypted data in accordance with the predetermined encoding scheme to thereby generate response data. The transmitter unit 230 transmits an RF signal at the frequency $f_2$ carrying the response data.

Referring back to FIG. 11B, when the receiver unit 350 of the reader/writer device 304 receives the RF signal at the frequency $f_2$, the receiver unit 350 demodulates the received RF signal in the time period of processing for reception 482 to thereby reproduce encoded data. The data decoding unit 342 decodes the encoded data in accordance with the predetermined encoding scheme to thereby reproduce the response data containing the tag ID, and then provides the reproduced tag ID to the control unit 310. In response to reception of the response data, the control unit 310 searches the received tag ID list LID in the memory 314 for the received tag ID. When a tag ID corresponding to the received tag ID is not recorded in the list, the control unit 310 adds the received tag ID into the list LID, and records the reception time of day or the present time of day in association with the tag ID.

After that, the RF ID tag 204 performs carrier sensing 50 and 52 of an RF signal at the frequency $f_1$ in the cycle Tcs, and transmits an RF signal at the frequency $f_2$ carrying encoded encrypted data containing the tag ID in the processing for transmission 56 within each of the predetermined periods of time occurring in the cycle Ts. The reader/writer device 304 receives the RF signal at the frequency $f_2$ from the RF ID tag 204, and the control unit 310 determines whether the received tag ID corresponds to the tag ID recorded in the tag ID list LID. If so, the control unit 310 records the reception time of day or the present time of day into the tag ID list LID in association with the recorded tag ID. The reader/writer device 304 (the control unit 310) may provide the tag ID and the time-of-day information recorded in the tag ID list LID to the host computer. When a predetermined time has elapsed since the recorded previous reception time of day for the tag ID in the tag ID list LID, the control unit 310 deletes the tag ID and its associated information from the list LID.

Referring to the center of FIGS. 11A through 11C, for example, when the user moves from the patient's room to the corridor, the reader/writer device 306 receives an RF signal at the frequency $f_2$ transmitted by the active-type RF ID tag 204 within the time period of processing for transmission 56. The reader/writer device 306 operates similarly to the reader/writer device 304. Thus the reader/writer device 306 demodulates the received RF signal in the processing for reception 481, and then decodes and decrypts the demodulated encoded data to thereby reproduce the received data containing the tag ID. In response to reception of the tag ID, the control unit 310 of the reader/writer device 306 searches the tag ID list LID in the memory 314 for the received tag ID. When a tag ID corresponding to the received tag ID is not recorded in the list LID, the control unit 310 enables the transmitter unit 330 to cyclically transmit an RF signal at the frequency $f_1$ carrying the data such as the command described above in the successive time slots at sufficiently short intervals in the processing for transmission 42 within a predetermined period of time. The command contains values of the cycle period Tcs for the carrier sensing 50 and 52 and the cycle period Ts of the time periods for processing for transmission 56, for the RF ID tag 204.

In the time period of carrier sensing 52, the RF ID tag 204 receives the RF signal at the frequency $f_1$, so that it determines the presence of a received RF signal carrier. The RF ID tag 204 receives and demodulates the RF signal to thereby reproduce encoded data containing the command, then decodes the encoded data in accordance with the predetermined encoding scheme, and then decrypts the data in accordance with the predetermined cryptosystem to thereby reproduce the received command. In response to the received command, the control unit 210 sets up the values of the cycle period Tcs for carrier sensing 50 and 52 and the cycle period Ts of time periods for processing for transmission 56 contained in the command, into the timers 274 and 275, respectively. After that, the RF ID tag 204 performs carrier sensing 50 and 52 of an RF signal at the frequency $f_1$ in the set cycle Tcs, and transmits an RF signal at the frequency $f_2$ carrying encoded encrypted data containing the tag ID in the processing for transmission 56 within each of the predetermined time periods occurring in the set cycle Ts. The other operations of the RF ID tag 204 and the reader/writer device 306 are similar to those of the RF ID tag 204 and the reader/writer device 304 described above with reference to the left of FIGS. 11A to 11C.

For example, when the user moves from the corridor back to the patient's room, the reader/writer device 304 receives again an RF signal at the frequency $f_2$ transmitted by the active-type RF ID tag 204 within the time period of processing for transmission 56.

According to the embodiment of the invention as described above, in response to the request by the reader/writer devices 304 and 306, the values of the carrier sensing cycle period and the RF signal transmission cycle period of the active-type RF ID tag 204 can be changed or updated. This significantly reduces the power consumption of the active-type RF ID tag 204, while the active-type RF ID tag 204 is located close to the reader/writer device 304 for a long time. Hence the battery run time thereof is extended.

Figure 12:
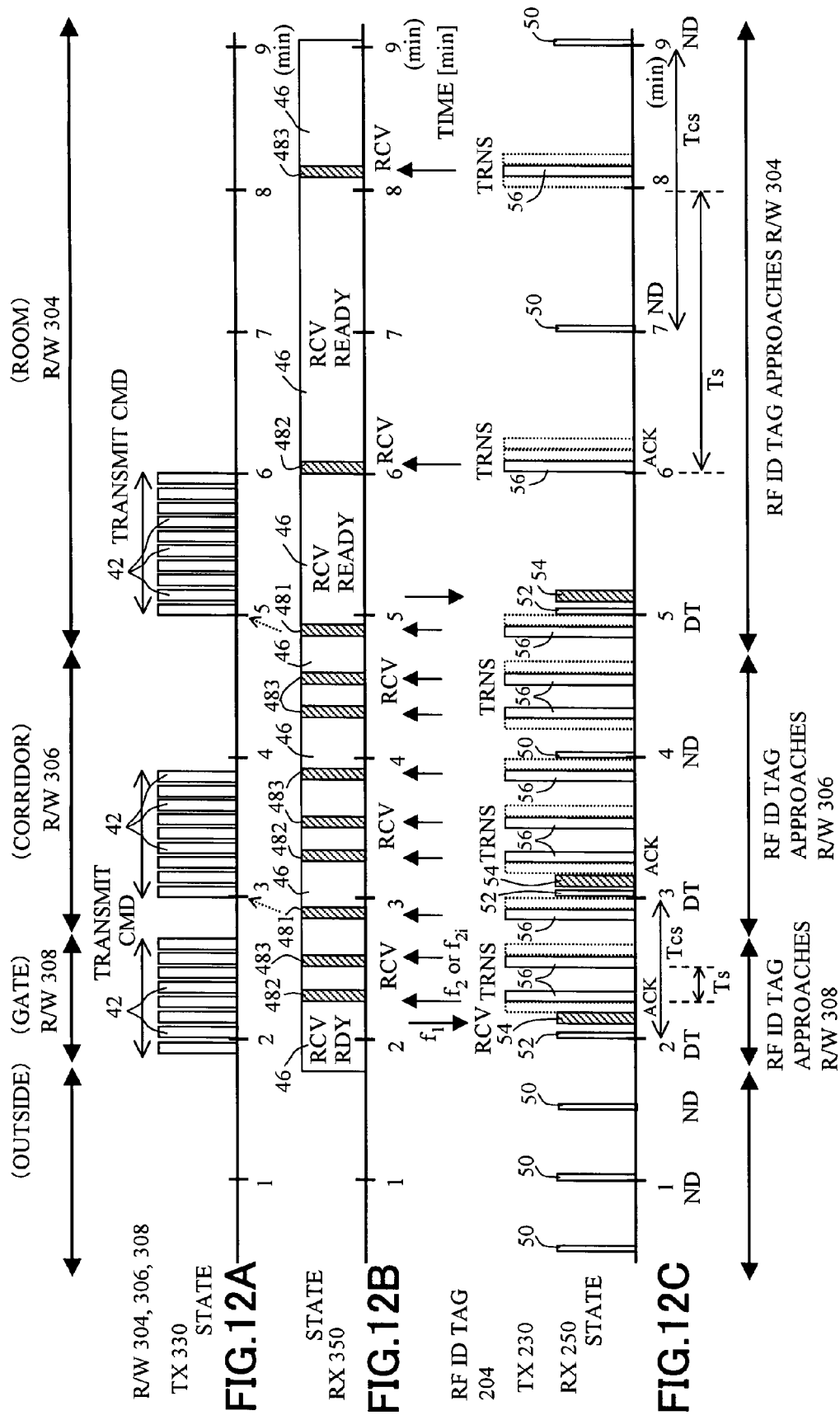
FIG. 12A shows a time chart of processing for transmission of an RF signal carrying data containing a tag ID request or an information request command (CMD) transmitted by the reader/writer devices arranged at different positions.
FIG. 12B shows a time chart of a receive ready state and of processing for reception of a received RF signal in the reader/writer devices.
FIG. 12C shows a time chart of carrier sensing, processing for reception of a received RF signal, and processing for transmission of an RF signal carrying data containing tag information such as a tag ID or a response, in the active-type RF ID tag.

FIG. 12A shows a time chart of processing for transmission 42 of an RF signal carrying data containing a tag ID request or an information request command (CMD) transmitted by the reader/writer devices 304, 306 and 308 arranged at different positions. FIG. 12B shows a time chart of a receive ready state 46 and of processing for reception 481 to 483 of a received RF signal in the reader/writer devices 304, 306 and 308. FIG. 12C shows a time chart of carrier sensing 50 and 52, processing for reception 54 of a received RF signal, and processing for transmission 56 of an RF signal carrying data containing tag information such as a tag ID or a response, in the active-type RF ID tag 204.

For detecting the presence of a user in a place, the reader/writer device 304 is arranged, for example, in a room of an office where the user may stay for a long time. The reader/writer device 306 has a configuration similar to that of the reader/writer device 304, and is arranged, for example, in a corridor of the office where the user passes temporarily, for detecting the temporary passage of the user. The reader/writer device 308 has a configuration similar to that of the reader/writer device 304. Thus, for the detecting temporary passage of the user, similarly to the reader/writer device 302 (the data generation unit 322 and the transmitter unit 330) in FIG. 7A, the reader/writer device 308 always transmits cyclically at sufficiently short intervals an RF signal carrying data such as the command. The reader/writer device 308 may be arranged, for example, at a gate of the office where the user passes temporarily. It is assumed that the user carries the active-type RF ID tag 204.

Referring to the left of FIG. 12C, for example, until the user moving from the outside into the office passes the gate, the active-type RF ID tag 204 performs carrier sensing 50 and 52 of an RF signal at the frequency $f_1$ in the cycle Tcs, similarly to the operation of the RF ID tag 202 shown in FIG. 7C, and stops transmission of an RF signal at the frequency $f_2$, i.e., transmits in the cycle Ts=∞. Before the user passes the gate into the office, the data generation unit 222 and the transmitter unit 230 are disabled. The cycle period Tcs may be, for example, 30 seconds.

Referring to the center of FIG. 12A, independently of reception of an RF signal at the frequency $f_2$, the reader/writer device 308 always transmits cyclically at sufficiently short intervals an RF signal carrying data such as the command. The command contains values of the cycle period Tcs for carrier sensing 50 and 52 and the cycle period Ts of time periods for processing for transmission 56, for the RF ID tag 204. For example, the cycle period Tcs is one (1) minute, and the cycle period Ts is twenty (20) seconds.

In the time period of carrier sensing 52, the RF ID tag 204 receives the RF signal at the frequency $f_1$, so that it determines the presence of a received RF signal carrier. The RF ID tag 204 receives and demodulates the RF signal to thereby reproduce encoded data containing the command, then decodes the reproduced encoded data in accordance with the predetermined encoding system, and then decrypts the decoded data in accordance with the predetermined cryptosystem to thereby reproduce the command. In response to the received command, the control unit 210 sets up the values of the cycle period Tcs for carrier sensing 50 and 52 and the cycle period Ts of periods for processing for transmission 56 contained in the command, into the timers 274 and 275. After that, the RF ID tag 204 performs carrier sensing 50 and 52 of an RF signal at the frequency $f_1$ in the cycle Tcs, and then transmits an RF signal at the frequency $f_2$ carrying encoded encrypted data containing the tag ID in the processing for transmission 56 within each of the predetermined periods of time occurring in the cycle Ts. The other operation of the RF ID tag 204 is similar to that shown in FIGS. 11A to 11C.

Referring to the center of FIG. 12A, in the time periods of processing for reception 482 and 483, the reader/writer device 308 receives the RF signal at the frequency $f_2$ from the RF ID tag 204 and determines the presence or absence of the received tag ID in the tag ID list LID. Then, when a tag ID corresponding to the received tag ID is not present or recorded in the list LID, the reader/writer device 308 adds or records the received tag ID into the list LID, and records the reception time-of-day or the present time of day in association with the received tag ID.

Referring to the center of FIGS. 12B and 12C, for example, when the user moves from the gate to the corridor in the office, the reader/writer device 306 receives an RF signal at the frequency $f_2$ transmitted by the active-type RF ID tag 204 in the time period of processing for transmission 56. The other operations of the RF ID tag 204 and the reader/writer device 306 are similar to those shown in FIGS. 11A to 11C. In this case, for example, the cycle period Tcs is one (1) minute, and the cycle period Ts is twenty (20) seconds.

Referring to the center of FIGS. 12B and 12C, for example, when the user moves from the corridor and enters into the room of the office, the reader/writer device 304 receives an RF signal at the frequency $f_2$ transmitted by the active-type RF ID tag 204 in the time period of processing for transmission 56. The other operations of the RF ID tag 204 and the reader/writer device 304 are similar to those shown in FIGS. 11A to 11C. For example, the cycle period Tcs is two (2) minute, and the cycle period Ts is two (2) minutes.

Figure 13:
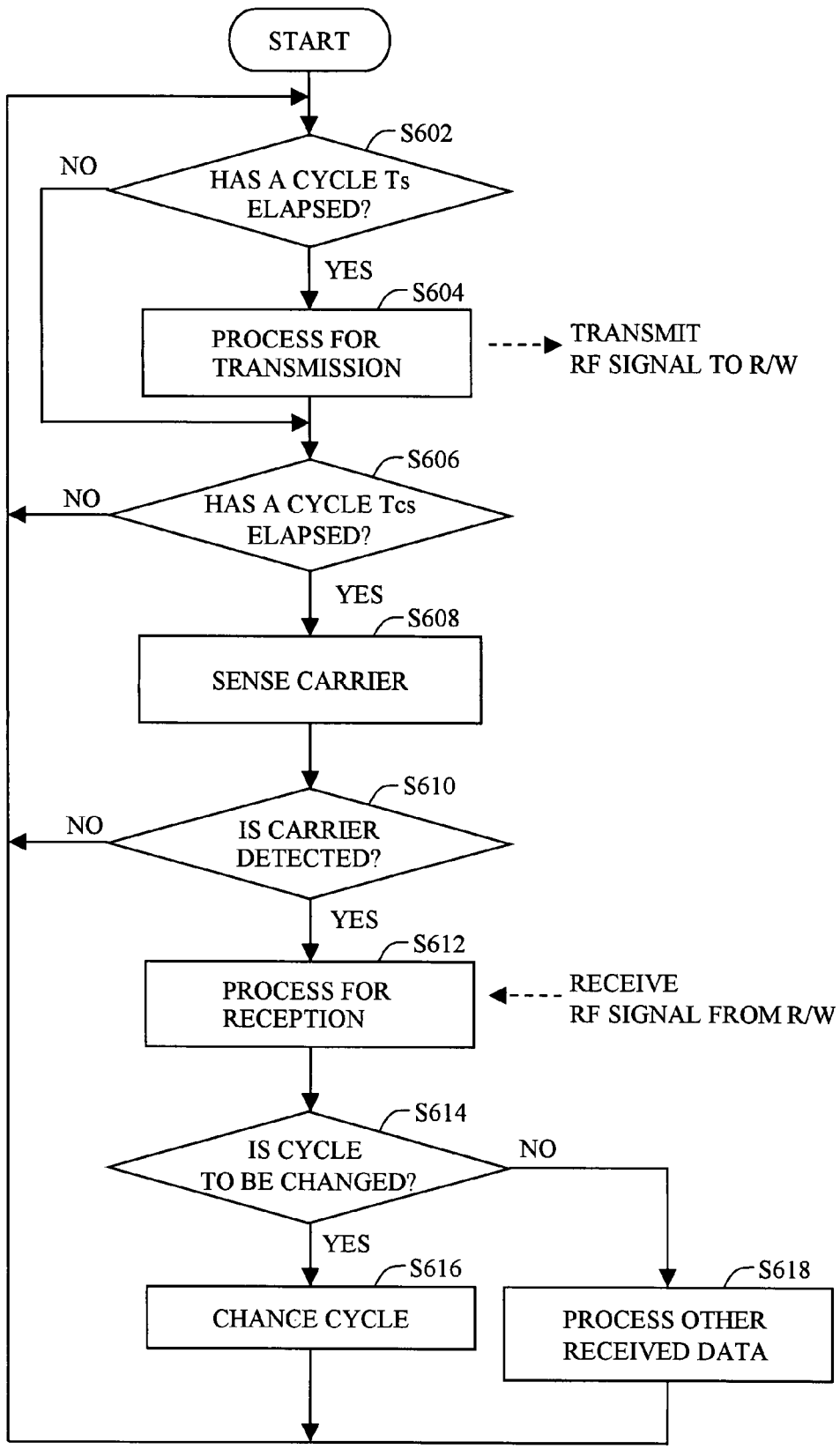
FIG. 13 shows a flow chart for the processing performed by the active-type RF ID tag.
Figure 14A:
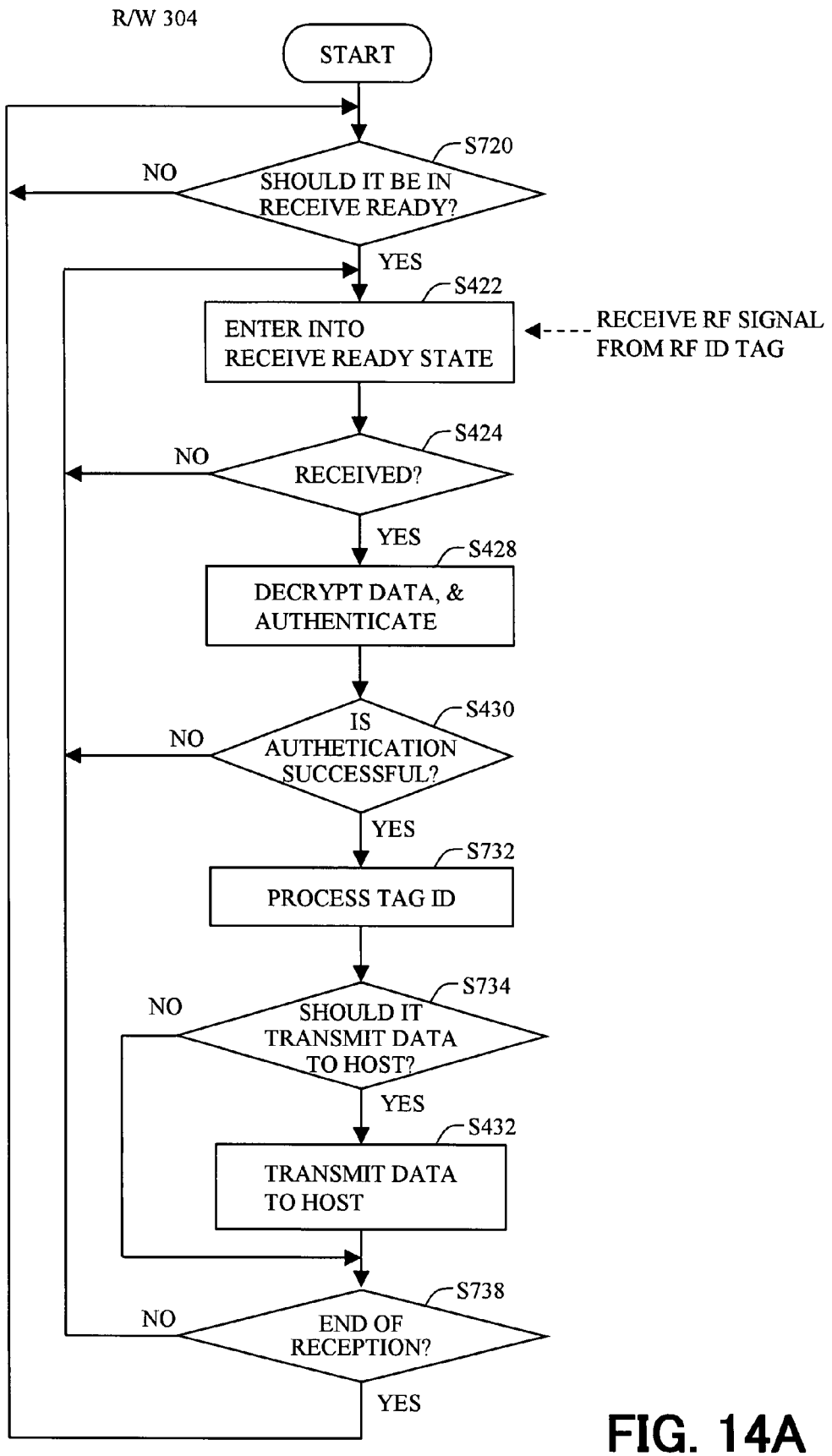
FIGS. 14A and 14B show a flow chart for the processing performed by the reader/writer device.
Figure 14B:
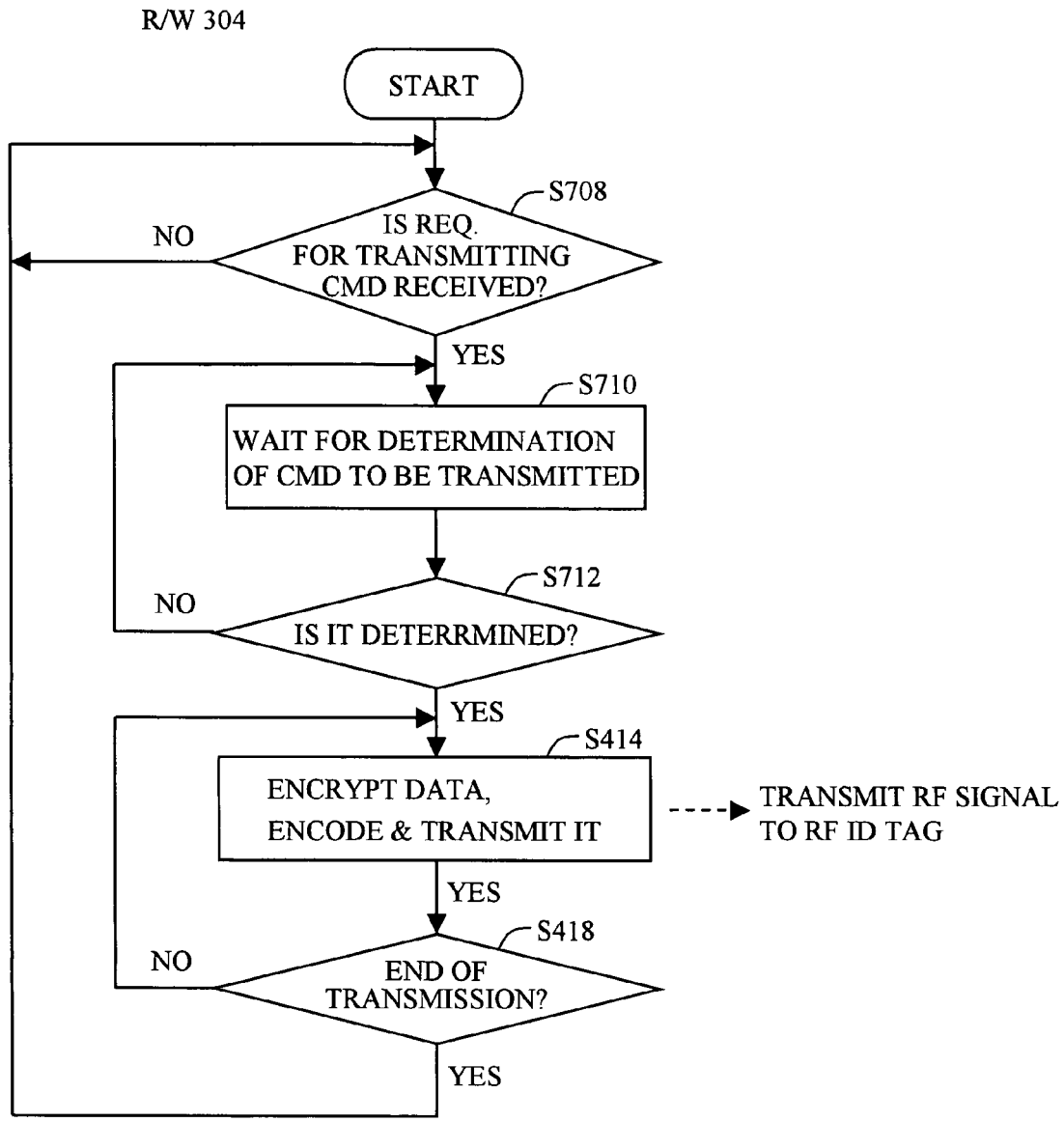

FIG. 13 shows a flow chart for the processing performed by the active-type RF ID tag 204. FIGS. 14A and 14B show a flow chart for the processing performed by the reader/writer device 304.

Referring to FIG. 13, at Step 602, the control unit 210 of the active-type RF ID tag 204 determines whether the wakeup signal received from the wakeup unit 270 (timer 275) indicates an ON state (ON), and thereby determines whether the one cycle period Ts of the predetermined time periods for the processing for transmission 56 has elapsed. If it is determined that that the cycle period Ts has elapsed, the control unit 210 at Step 604 enables the data generation unit 222 and the transmitter unit 230 to perform processing for transmission 56 in a time period or time slot selected at random within a predetermined period of time. After that, the data generation unit 222 and the transmitter unit 230 are disabled. Then, the procedure proceeds to Step 606. If it is determined at Step 602 that the cycle period Ts has not yet elapsed, the procedure proceeds to Step 606.

At Step 606, the control unit 210 determines whether the wakeup signal received from the wakeup unit 270 (timer 274) indicates an ON state, and thereby determines whether the one cycle period Tcs of carrier sensing 50 and 52 has elapsed. If it is determined that the cycle period Tcs has elapsed, the control unit 210 at Step 608 enables the receiver unit 250 and the carrier determination unit 246 to perform carrier sensing 50 and 52. Then, the procedure proceeds to Step 610. If it is determined at Step 606 that the cycle period Tcs has not yet elapsed, the procedure returns to Step 602.

At Step 610, in accordance with the resultant determination by the carrier determination unit 246, the control unit 210 determines whether a carrier has been detected. If it is determined that a carrier has not been detected, the procedure returns to Step 602. After that, the receiver unit 250 and the carrier determination unit 246 are disabled. If it is determined that a carrier has been detected, the control unit 210 at Step 612 disables the carrier determination unit 246, and continues to enable the receiver unit 250 to receive an RF signal at the frequency $f_1$ carrying data such as the command from the reader/writer device 304 and demodulate the received RF signal. After that, the control unit 210 disables the receiver unit 250. Further, the control unit 210 enables the data decoding unit 240 to decode the received data from the receiver unit 250 in accordance with the predetermined encoding scheme and to decrypt the decoded data in accordance with the predetermined cryptosystem. The decrypted data is used for authentication.

When the authentication is successful, the control unit 210 at Step 614 determines whether the command in the decrypted data contains a request for changing the cycle period Ts and/or the cycle period Tcs. If it is determined that it contains a request for changing the cycle period or periods, the control unit 210 at Step 616 sets up values of the cycle period Ts and/or the cycle period Tcs into the timer 274 and/or the timer 275 of the wakeup unit 270, respectively. If it is determined that it does not contain a request for changing the cycle period or periods, the control unit 210 at Step 618 processes other received data as occasion demands. Then, the procedure returns to Step 602.

Referring to FIG. 14A, the control unit 310 of the reader/writer device 304 at Step 720 determines whether it should enter into the receive ready state. If it is determined that it should enter into the receive ready state, the procedure proceeds to Step 422. Step 720 is repeated until it is determined that it should enter into the receive ready state. Steps 422 through 430 are similar to those of FIG. 8.

When the authentication is successful, the control unit 310 at Step 732 processes received data containing the tag ID and the like, as occasion demands. The tag ID is used, for example, for collating with the tag IDs in the list LID as described above. At Step 734, the control unit 310 determines whether it should be transmit the data to the host computer. If it determined that it should not transmit the data, the procedure proceeds to Step 738. If it determined that it should transmit the data, the control unit 310 at Step 432 transmits the data to the host computer. At Step 738, the control unit 310 determines whether the receive ready state should be terminated. If it determined that the receive ready state should be terminated, the procedure returns to Step 720. If it determined that the data receive ready state is to be continued, the procedure returns to Step 422.

Referring to FIG. 14B, the control unit 310 at Step 708 determines whether there is a request for transmitting a command. The request for transmitting a command may be received from the host computer, or may be generated by the control unit 310 in the processing for reception 48 (Step 732 in FIG. 13). Step 708 is repeated until there appears a request for transmitting a command. If it is determined that there is a request for transmitting a command, the control unit 310 at Step 710 waits for determination of a command to be transmitted. The command to be transmitted may be received from the host computer, or may be determined by the control unit 310 in the processing for reception 48 (Step 732 in FIG. 13). At Step 712, the control unit 310 determines whether the command to be transmitted has been determined. Steps 710 to 712 are repeated until the command to be transmitted is determined.

Steps 414 and 418 are similar to those of FIG. 8, and are performed for the processing for transmission 42 only in a predetermined period of time.

Figure 15:
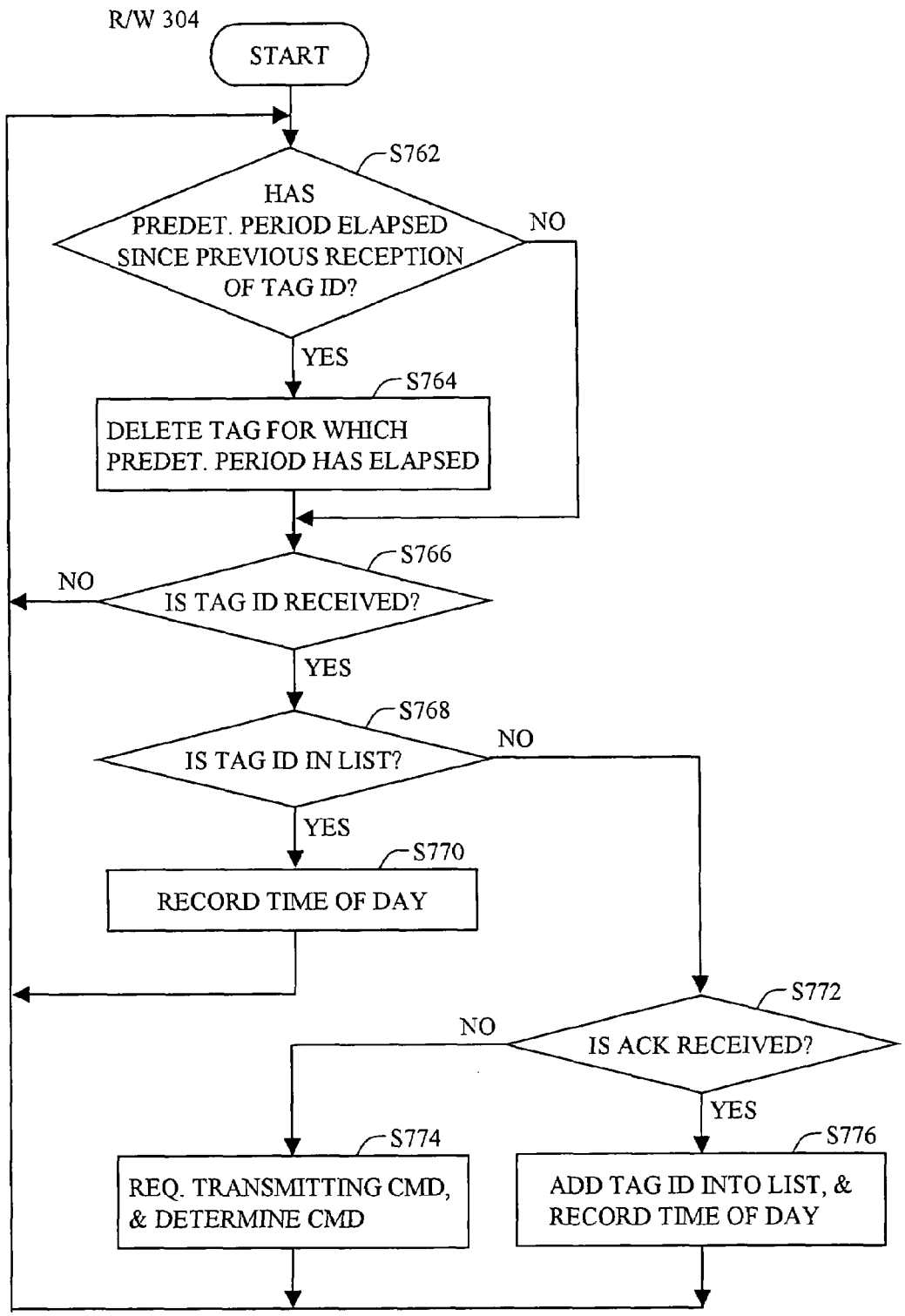
FIG. 15 shows a flow chart for processing the tag ID, which is executed by the reader/writer device and/or a host computer.

FIG. 15 shows a flow chart for processing the tag ID, which is executed by the reader/writer device 304 at Step 732 of FIG. 14A and/or by the host computer having received the data transmitted at Step 432 of FIG. 14A. The following assumes that the reader/writer device 304 executes the processing. However, the host computer may execute similar processing.

At Step 762, the control unit 310 of the reader/writer device 304 searches the tag ID list LID to determine whether a predetermined period of time of, for example, fifteen (15) minutes has elapsed after the previous reception of any one of the tag IDs in the list LID. If it determined that the predetermined period of time for any of the tag IDs has not yet elapsed, the procedure proceeds to Step 766. If it determined that the predetermined period of time has elapsed for one of the tag IDs, the control unit 310 at Step 764 deletes, from the list LID, the tag ID for which the predetermined period of time has elapsed.

At Step 766, the control unit 310 determines whether a tag ID has been newly received from an RF ID tag. If it determined that a tag ID has not been received, the procedure returns to Step 762. If it determined that a tag ID has been received, the control unit 310 at Step 768 determines whether a tag ID corresponding to the received tag ID is recorded in the list LID. If it determined that such a tag ID is recorded in the list LID, the control unit 310 records the present time of day or the reception time of day into the list LID in association with the recorded tag ID. Then, the procedure returns to Step 762.

If it determined at Step 768 that such a tag ID is not recorded in the list LID, the control unit 310 at Step 722 determines whether the receiver unit 350 receives a response of acknowledgement (ACK) of reception of the transmission command from the RF ID tag. If it determined that a response of acknowledgement of reception has not been received, the control unit 310 at Step 774 requests transmitting a command, and determines a command to be transmitted. If it determined that a response of acknowledgement of reception has been received, the control unit 310 at Step 776 adds the received tag ID into the list LID, and records the reception time of day or the present time of day in association with it. Then, the procedure returns to Step 762.

Although the invention has been described in connection with application to the RF ID tags, it should be understood by those skilled in the art that the invention is not limited to this application and is also applicable to contactless IC cards.

The above-described embodiments are only typical examples, and their combination, modifications and variations are apparent to those skilled in the art. It should be noted that those skilled in the art can make various modifications to the above-described embodiments without departing from the principle of the invention and the accompanying claims.

What is claimed is:

1. An information access system for accessing information stored in a contactless information storage device, the information access system comprising:
   a reader/writer device connected to an information processing apparatus, the reader/writer device including:
   a first timer,
   a first memory,
   a first transmitter unit which is capable of cyclically transmitting an information request signal at a first frequency during a time period for information request transmission,
   a first receiver unit which is continuously ready to receive an RF signal at a second frequency different from the first frequency, and
   a first controller which, in response to reception of a tag information signal at the second frequency, reproduces and compares received tag information carried by the tag information signal with a list of tag information in the first memory; and an active-type contactless information storage device including:
a second memory,
a battery,
a second timer which generates a first cycle for transmitting tag information,
a third timer which generates a second cycle for sensing a carrier,
a second receiver unit which is capable of sensing a carrier of an RF signal at the first frequency for detection,
a second transmitter unit which is capable of transmitting a tag information signal at the second frequency, and
a second controller which controls the second receiver unit to sense a carrier of an RF signal at the first frequency in time periods for carrier sensing occurring in the second cycle, then in response to detection of a carrier of an RF signal at the first frequency in the second receiver unit, causes the second receiver unit to further receive the information request signal, and which causes the second transmitter unit to transmit the tag information signal at the second frequency carrying information stored in the second memory in time periods for tag information transmission occurring in the first cycle, and which, in response to reception of the information request signal in the second receiver unit, reproduces and processes received information carried by the information request signal, and which controls the second receiver unit to change from an active state to an inactive state in response to non-detection of an RF signal at the first frequency in a particular time period for the carrier sensing in the second receiver unit, and which controls the second transmitter unit to change from an active state to an inactive state in response to an end of a particular time period for the tag information transmission occurring in the first cycle.

2. An information access system according to claim 1, wherein, during the period of time for information request transmission which occurs temporarily, the first controller causes the first transmitter unit to cyclically transmit the information request signal at the first frequency carrying values of the first cycle and the second cycle, and wherein when information carried by the information request signal received by the second receiver unit contains the values of the first and second cycle, the second controller sets the values of the first and second cycle periods into the second and third timers, respectively.

3. An information access system according to claim 1, wherein when the second receiver unit receives the information request signal at the first frequency, the second controller, in the subsequent tag information transmission period for transmitting the tag information, further causes the second transmitter unit to transmit the tag information signal at the second frequency carrying a response and information stored in the second memory.

4. An information access system according to claim 1, wherein, when the received tag information does not correspond to any tag information recorded in the list of tag information, the first controller causes the first transmitter unit to be in an active state and cyclically transmit the information request signal during the period of time for information request transmission which period occurs temporarily.

5. An information access system according to claim 1, wherein, when the received tag information carried by the tag information signal contains a response to the tag information request signal, the first controller records, into the list of tag information, the received tag information and time of day in association with the received tag information, without further causing the first transmitter unit to transmit the information request signal.

6. An information access system according to claim 1, wherein, when the received tag information corresponds to tag information recorded in the list of tag information, the first controller records, into the list of tag information, time of day in association with the tag information in the list of tag information, without causing the first transmitter unit to transmit the information request signal.

7. An information access system according to claim 5, wherein the first controller deletes tag information in the list of tag information, when tag information corresponding to the tag information in the list of tag information has not been received for an elapse of a time since previous reception of the tag information in the list of tag information.

8. The information access system according to claim 1, wherein the first controller causes the first transmitter unit to continue to cyclically transmit the information request signal.

9. A contactless reader/writer device connected to an information processing apparatus and capable of accessing information stored in a contactless information storage device, the contactless reader/writer device comprising:
a memory;
a transmitter unit which is capable of transmitting cyclically an information request signal at a first frequency during a period of time for information request transmission;
a receiver unit which is continuously ready to receive an RF signal at a second frequency different from the first frequency; and
a controller which, in response to reception of a tag information signal at the second frequency in the receiver unit, reproduces and compares received tag information carried by the tag information signal with a list of tag information in the memory, and then causes the transmitter unit to cyclically transmit the information request signal at the first frequency during the period of time for information request transmission which period occurs temporarily when the received tag information does not correspond to any tag information recorded in the list of tag information.

10. A contactless reader/writer device according to claim 9, wherein, during the period of time for information request transmission which occurs temporarily, the controller causes the transmitter unit to cyclically transmit the information request signal at the first frequency carrying values of the first cycle and the second cycle.

11. A contactless reader/writer device according to claim 9, wherein, when the received tag information carried by the tag information signal contains a response to the tag information request signal, the controller records, into the list of tag information, the received tag information and time of day in association with the received tag information, without further causing the transmitter unit to transmit the information request signal.

12. A contactless reader/writer device according to claim 9, wherein, when the received tag information corresponds to tag information recorded in the list of tag information, the controller records, into the list of tag information, time of day in association with the tag information in the list of tag information, without further causing the transmitter unit to transmit the information request signal.

13. A contactless reader/writer device according to claim 11, wherein the controller deletes tag information in the list of tag information, when tag information corresponding to the tag information in the list of tag information has not been received for an elapse of a time since previous reception of the tag information in the list of tag information.

14. An active-type contactless information storage device which is accessible by a reader/writer device, the active-type contactless information storage device comprising:
   a memory;
   a battery;
   a first timer which generates a first cycle for transmitting tag information;
   a second timer which generates a second cycle for sensing a carrier;
   a receiver unit which is capable of sensing a carrier of an RF signal at a first frequency for detection;
   a transmitter unit which is capable of transmitting a tag information signal at a second frequency different from the first frequency; and
   a controller which controls the receiver unit to sense a carrier of an RF signal at the first frequency in time periods for carrier sensing occurring in the second cycle, then in response to detection of a carrier of an RF signal at the first frequency in the receiver unit, causes the receiver unit to further receive the information request signal, and which causes the transmitter unit to transmit the tag information signal at the second frequency carrying information stored in the memory in time periods for tag information transmission occurring in the first cycle, and which, in response to reception of the information request signal in the receiver unit, reproduces and processes received information carried by the information request signal and further causes the transmitter unit to transmit the tag information signal at the second frequency carrying a response and information stored in the memory in a subsequent time period for the tag information transmission, and which controls the receiver unit to change from an active state to an inactive state in response to non-detection of an RF signal at the first frequency in a particular time period for the carrier sensing in the receiver unit, and which controls the transmitter unit to change from an active state to an inactive state in response to an end of a particular time period for the tag information transmission occurring in the first cycle.

15. A computer-readable recording medium storing a program for use in a contactless reader/writer device, the contactless reader/writer device being connected to an information processing apparatus and capable of accessing information stored in a contactless information storage device, the contactless reader/writer device comprising: a memory, a controller, a transmitter unit which is capable of transmitting cyclically an information request signal at a first frequency during a period of time for information request transmission under the control of the controller, a receiver unit which is continuously ready to receive an RF signal at a second frequency different from the first frequency, the program causing the controller to execute:
   in response to reception of a tag information signal at the second frequency in the receiver unit, reproducing and comparing received tag information carried by the tag information signal with a list of tag information in the memory, and
   causing the transmitter unit to cyclically transmit the information request signal at the first frequency during the period of time for information request transmission which period occurs temporarily, when the received tag information does not correspond to any tag information recorded in the list of tag information.

16. A recording medium according to claim 15, the program causing the controller to further execute: causing the controller to further execute: recording, into the list of tag information, the received tag information and time of day in association with the received tag information, without further causing the transmitter unit to transmit the information request signal, when the received tag information carried by the tag information signal contains a response to the tag information request signal.

17. A recording medium according to claim 15, the program causing the controller to further execute: recording, into the list of tag information, time of day in association with the tag information in the list of tag information, without further causing the transmitter unit to transmit the information request signal, when the received tag information corresponds to the tag information recorded in the list of tag information.

18. A recording medium according to claim 16, the program causing the controller to further execute: deleting tag information in the list of tag information, when tag information corresponding to the tag information in the list of tag information has not been received for an elapse of a time since previous reception of the tag information in the list of tag information.

19. A computer-readable recording medium storing a program for use in an active-type contactless information storage device which is accessible by a reader/writer device, the active-type contactless information storage device comprising: a memory, a controller, a battery, a receiver unit which is capable of sensing a carrier of an RF signal at a first frequency for detection, and a transmitter unit which is capable of transmitting a tag information signal at a second frequency different from the first frequency, the program causing the controller to execute:
   causing the transmitter unit to transmit the tag information signal at the second frequency carrying information stored in the memory in time periods for tag information transmission occurring in a first cycle,
   controlling the receiver unit to sense a carrier of an RF signal at the first frequency in time periods for carrier sensing occurring in a second cycle,
   in response to detection of an RF signal at the first frequency in the receiver unit, causing the receiver unit to further receive the information request signal,
   in response to reception of the information request signal in the receiver unit, reproducing and processing received information carried by the information request signal and further causing the transmitter unit to transmit the tag information signal at the second frequency carrying a response and information stored in the memory,
   controlling the receiver unit to change from an active state to an inactive state in response to non-detection of an RF signal at the first frequency in a particular time period for the carrier sensing in the receiver unit, and
   controlling the transmitter unit to change from an active state to an inactive state in response to an end of a particular time period for the tag information transmission occurring in the first cycle.

20. In a reader/writer device connected to an information processing apparatus and capable of accessing information stored in a contactless information storage device, a method of accessing information stored in a contactless information storage device, the reader/writer device comprising: a memory, a controller, a transmitter unit which is capable of transmitting cyclically an information request signal at a first frequency during a period of time for information request transmission under the control of the controller, a receiver unit which is continuously ready to receive an RF signal at a second frequency different from the first frequency, the method comprising:

in response to reception of a tag information signal at the second frequency in the receiver unit, comparing received tag information carried by the tag information signal with a list of tag information in the memory, and causing the transmitter unit to cyclically transmit the information request signal at the first frequency during the period of time for information request transmission which period occurs temporarily, when the received tag information does not correspond to any tag information recorded in the list of tag information.

* * * * *